(12) United States Patent
Sumiya

(10) Patent No.: US 12,272,378 B2
(45) Date of Patent: Apr. 8, 2025

(54) MAGNETIC TAPE CARTRIDGES PACKAGE

(71) Applicant: FUJIFILM CORPORATION, Tokyo (JP)

(72) Inventor: Yosuke Sumiya, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/352,221

(22) Filed: Jul. 13, 2023

(65) Prior Publication Data
US 2024/0055023 A1 Feb. 15, 2024

(30) Foreign Application Priority Data
Aug. 15, 2022 (JP) ................................. 2022-129384

(51) Int. Cl.
G11B 23/03 (2006.01)

(52) U.S. Cl.
CPC ........ G11B 23/0307 (2013.01); G11B 23/032 (2013.01)

(58) Field of Classification Search
None
See application file for complete search history.

(56) References Cited

U.S. PATENT DOCUMENTS

| | | | |
|---|---|---|---|
| 3,228,518 A * | 1/1966 | Coby | B65D 5/5038 206/562 |
| 3,613,871 A * | 10/1971 | Evans | G11B 23/0236 217/18 |
| 3,710,900 A * | 1/1973 | Fink | A45C 13/02 190/110 |
| 3,885,668 A * | 5/1975 | McClain | B07C 7/02 206/505 |
| 3,938,871 A * | 2/1976 | Bartholomew | A47B 96/04 312/334.44 |
| 4,437,713 A * | 3/1984 | Roach | B65D 5/38 229/122 |
| 4,600,107 A * | 7/1986 | Price | G11B 23/0236 211/41.12 |

(Continued)

FOREIGN PATENT DOCUMENTS

| | | | |
|---|---|---|---|
| EP | 1813544 A1 * | 8/2007 | ........... B65D 11/188 |
| GB | 1337698 A * | 11/1973 | |

(Continued)

OTHER PUBLICATIONS

Extended European Search Report dated Jan. 11, 2024, issued in corresponding EP Patent Application No. 23189226.6.

Primary Examiner — William J Klimowicz
(74) Attorney, Agent, or Firm — SOLARIS Intellectual Property Group, PLLC

(57) ABSTRACT

A package includes a plurality of accommodation regions where a plurality of holders are accommodated in such a manner that the plurality of holders are able to be put in and out, and a partition structure that divides the plurality of accommodation regions. Each holder holds a plurality of magnetic tape cartridges in such a manner that the plurality of magnetic tape cartridges are able to be put in and out of the holder. In a state in which the holder is accommodated in the accommodation region, a height of the partition structure is higher than a height of the holder.

10 Claims, 14 Drawing Sheets

(56) References Cited

U.S. PATENT DOCUMENTS

| | | | | |
|---|---|---|---|---|
| 4,709,815 A | * | 12/1987 | Price | G11B 23/0236 |
| | | | | 211/41.12 |
| 4,730,735 A | * | 3/1988 | Lechner | G11B 23/0236 |
| | | | | 211/41.12 |
| 4,782,958 A | * | 11/1988 | Price | G11B 23/0236 |
| | | | | 211/41.12 |
| 4,846,355 A | * | 7/1989 | Price, Sr. | G11B 23/0236 |
| | | | | 211/41.12 |
| 2004/0112788 A1 | | 6/2004 | Meyer | |
| 2005/0006270 A1 | * | 1/2005 | Byrne | G11B 33/08 |
| | | | | 206/521 |
| 2005/0078406 A1 | | 4/2005 | Topham | |
| 2007/0095684 A1 | | 5/2007 | Lee | |
| 2007/0175778 A1 | * | 8/2007 | Imai | B65D 5/5038 |
| | | | | 206/521 |
| 2009/0078603 A1 | * | 3/2009 | Imai | G11B 23/0236 |
| | | | | 206/387.1 |
| 2011/0226644 A1 | * | 9/2011 | Inugai | B65D 77/0413 |
| | | | | 206/307 |
| 2011/0273801 A1 | * | 11/2011 | Sumiya | G11B 23/107 |
| 2016/0185483 A1 | | 6/2016 | Youell et al. | |
| 2019/0295599 A1 | * | 9/2019 | Sumiya | B65D 85/671 |
| 2019/0332911 A1 | * | 10/2019 | Kagawa | G06K 19/06028 |

FOREIGN PATENT DOCUMENTS

| | | | | |
|---|---|---|---|---|
| JP | S62152978 U | * | 9/1987 | |
| JP | 2007030887 A | * | 2/2007 | |
| JP | 2007045441 A | * | 2/2007 | |
| JP | 2009-078821 A | | 4/2009 | |
| KR | 200272209 Y1 | * | 11/2002 | B65D 81/107 |
| KR | 2017002342 U | * | 6/2017 | B65D 33/1641 |

* cited by examiner

MAGNETIC TAPE CARTRIDGES PACKAGE

CROSS-REFERENCE TO RELATED APPLICATIONS

This application claims priority under 35 USC 119 from Japanese Patent Application No. 2022-129384, filed on Aug. 15, 2022, the entire disclosure of which is incorporated by reference herein.

BACKGROUND

1. Technical Field

A technique of the present disclosure relates to a package.

2. Related Art

JP2009-078821A discloses a cartridge storage case. The cartridge storage case described in JP2009-078821A stores a tabular cartridge in which a magnetic tape-wound reel is provided. The cartridge storage case described in JP2009-078821A is used in a state of being superimposed on another cartridge storage case, can hold the cartridge inside, and has at least one compartment that can store at least one of individual cartridges or a cartridge group having a plurality of cartridges in parallel. The cartridge storage case described in JP2009-078821A has a plurality of sub-compartments that can each store one cartridge independently, in the compartment.

SUMMARY

An embodiment according to the technique of the present disclosure provides a package capable of suppressing damage to a magnetic tape cartridge in the package.

A first aspect according to the technique of the present disclosure is a package comprising a plurality of accommodation regions where a plurality of holders are accommodated in such a manner that the plurality of holders are able to be put in and out, and a partition structure that divides the plurality of accommodation regions, in which each holder holds a plurality of magnetic tape cartridges in such a manner that the plurality of magnetic tape cartridges are able to be put in and out of the holder, and in a state in which the holder is accommodated in the accommodation region, a height of the partition structure is higher than a height of the holder.

A second aspect according to the technique of the present disclosure is the package according to the first aspect, in which the partition structure divides the plurality of accommodation regions in one direction.

A third aspect according to the technique of the present disclosure is the package according to the first aspect, in which the partition structure divides the plurality of accommodation regions in a lattice.

A fourth aspect according to the technique of the present disclosure is the package according to any one of the first aspect to the third aspect, in which a magnetic tape is accommodated in the magnetic tape cartridge, the holder is accommodated in the accommodation region in a posture in which the magnetic tape cartridges are set in a portrait orientation, and the portrait orientation is an orientation in which both ends of the magnetic tape in a width direction are positioned along a direction crossing a direction in which the holder is put in and out of the accommodation region.

A fifth aspect according to the technique of the present disclosure is the package according to any one of the first aspect to the fourth aspect, in which a single individual is formed by the holder and the plurality of magnetic tape cartridges held by the holder, and a whole of the single individual is covered with a coating material.

A sixth aspect according to the technique of the present disclosure is the package according to the fifth aspect, in which the coating material is a film.

A seventh aspect according to the technique of the present disclosure is the package according to the sixth aspect, in which the holder has a protruding piece protruding to an outside, and the whole of the single individual is covered with the film at pressure at which the protruding piece does not protrude from the film.

An eighth aspect according to the technique of the present disclosure is the package according to any one of the first aspect to the fourth aspect, in which the holder has an exposure region where the plurality of magnetic tape cartridges are exposed, and at least the exposure region of the holder is covered with a coating material.

A ninth aspect according to the technique of the present disclosure is the package according to the eighth aspect, in which the coating material is a film.

A tenth aspect according to the technique of the present disclosure is the package according to any one of the first aspect to the ninth aspect, in which the holder is a magazine for a magnetic tape cartridge formed to be loadable into a magnetic tape library.

An eleventh aspect according to the technique of the present disclosure is the package according to any one of the first aspect to the tenth aspect, in which an identifier is displayed on a surface of the magnetic tape cartridge.

BRIEF DESCRIPTION OF THE DRAWINGS

Exemplary embodiments of the technology of the disclosure will be described in detail based on the following figures, wherein.

DETAILED DESCRIPTION

Figure 1:
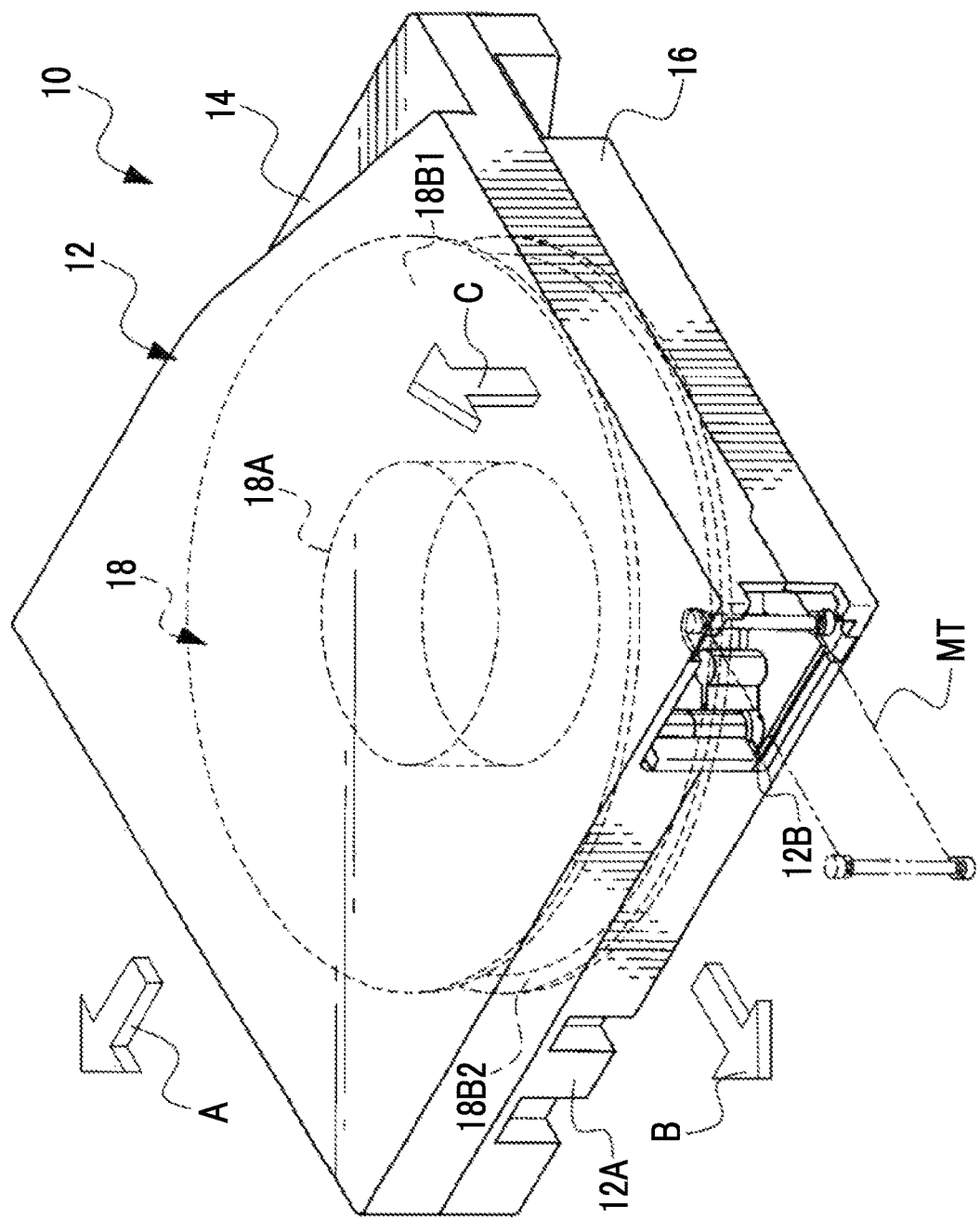
FIG. 1 is a schematic perspective view showing an example of an appearance of a magnetic tape cartridge according to first and second embodiments.

First, terms that are used in the following description will be described.

In the present embodiment, "parallel" indicates parallel in a meaning including an error that is generally allowed in the technical field to which the technique of the present disclosure belongs, and an error to such an extent not contrary to the spirit of the technique of the present disclosure, in addition to completely parallel. In the present embodiment, "regular interval" indicates a regular interval in a meaning including an error that is generally allowed in the technical field to which the technique of the present disclosure belongs, and an error to such an extent not contrary to the spirit of the technique of the present disclosure, in addition to a completely regular interval. In the present embodiment, "vertical" indicates vertical in a meaning including an error that is generally allowed in the technical field to which the technique of the present disclosure belongs, and an error to such an extent not contrary to the spirit of the technique of the present disclosure, in addition to completely vertical.

In the following description, for convenience of description, in FIG. 1, a direction of an arrow A is referred to as a front direction of a magnetic tape cartridge 10, and a side in the front direction of the magnetic tape cartridge 10 is referred to as a front side of the magnetic tape cartridge 10. In the following description on the structure of the magnetic tape cartridge 10, "front" indicates the front side of the magnetic tape cartridge 10.

In the following description, for convenience of description, in FIG. 1, a direction of an arrow B perpendicular to the direction of the arrow A is referred to as a right direction, and a side in the right direction of the magnetic tape cartridge 10 is referred to as a right side of the magnetic tape cartridge 10. In the following description on the structure of the magnetic tape cartridge 10, "right" indicates the right side of the magnetic tape cartridge 10.

In the following description, for convenience of description, in FIG. 1, a direction perpendicular to the direction of the arrow A and the direction of the arrow B is indicated by an arrow C, a direction of the arrow C is referred to as an up direction of the magnetic tape cartridge 10, and a side in the up direction of the magnetic tape cartridge 10 is referred to as an upside of the magnetic tape cartridge 10. In the following description on the structure of the magnetic tape cartridge 10, "up" indicates the upside of the magnetic tape cartridge 10.

In the following description, for convenience of description, in FIG. 1, a direction opposite to the front direction of the magnetic tape cartridge 10 is referred to as a rear direction of the magnetic tape cartridge 10, and a side in the rear direction of the magnetic tape cartridge 10 is referred to as a rear side of the magnetic tape cartridge 10. In the following description on the structure of the magnetic tape cartridge 10, "rear" indicates the rear side of the magnetic tape cartridge 10.

In the following description, for convenience of description, in FIG. 1, a direction opposite to the up direction of the magnetic tape cartridge 10 is referred to as a down direction of the magnetic tape cartridge 10, and a side in the down direction of the magnetic tape cartridge 10 is referred to as a downside of the magnetic tape cartridge 10. In the following description on the structure of the magnetic tape cartridge 10, "down" indicates the downside of the magnetic tape cartridge 10.

First Embodiment

As shown in FIG. 1 as an example, the magnetic tape cartridge 10 has a substantially rectangular shape in plan view, and comprises a box-shaped case 12. A magnetic tape MT is accommodated in the magnetic tape cartridge 10. The magnetic tape cartridge 10 is an example of a "magnetic tape cartridge" according to the technique of the present disclosure, and the magnetic tape MT is an example of a "magnetic tape" according to the technique of the present disclosure.

The case 12 is formed of resin, such as polycarbonate, and comprises an upper case 14 and a lower case 16. The upper case 14 and the lower case 16 are bonded by welding (for example, ultrasonic welding) and screwing in a state in which a lower peripheral edge surface of the upper case 14 and an upper peripheral edge surface of the lower case 16 are brought into contact with each other. A bonding method is not limited to welding and screwing, and other bonding methods may be used.

Inside the case 12, a cartridge reel 18 is rotatably accommodated. The cartridge reel 18 comprises a reel hub 18A, an upper flange 18B1, and a lower flange 18B2. The reel hub 18A is formed in a cylindrical shape. The reel hub 18A is a shaft center portion of the cartridge reel 18, has a shaft center direction along an up-down direction of the case 12, and is disposed in a center portion of the case 12. Each of the upper flange 18B1 and the lower flange 18B2 is formed in an annular shape. A center portion in plan view of the upper flange 18B1 is fixed to an upper end portion of the reel hub 18A, and a center portion in plan view of the lower flange 18B2 is fixed to a lower end portion of the reel hub 18A. A magnetic tape MT is wound around an outer peripheral surface of the reel hub 18A, and an end portion in a width direction of the magnetic tape MT is held by the upper flange 18B1 and the lower flange 18B2. The reel hub 18A and the lower flange 18B2 may be molded integrally.

An opening 12B is formed on a rear side of a right wall 12A of the case 12. The magnetic tape MT is pulled out from the opening 12B or is pulled back into the case 12 from the opening 12B.

Figure 2:
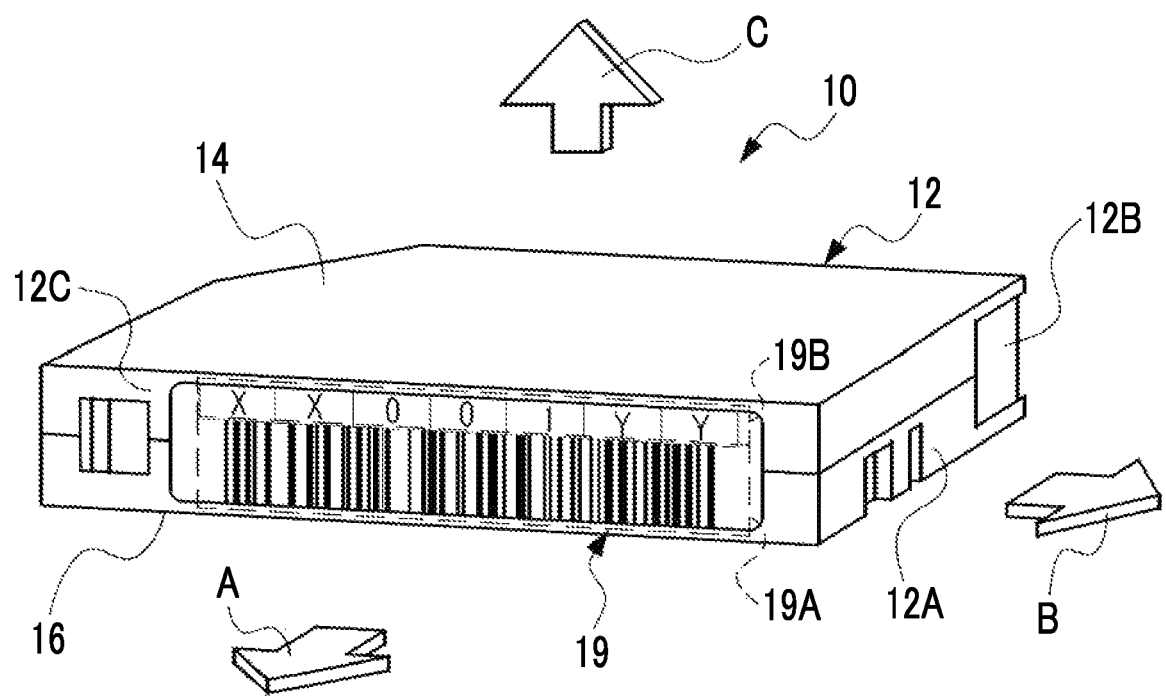
FIG. 2 is a schematic perspective view showing an example of an identifier displayed on the magnetic tape cartridge according to the first and second embodiments.

As shown in FIG. 2 as an example, the identifier 19 is displayed on the surface of the magnetic tape cartridge 10. The surface of the magnetic tape cartridge 10 indicates a surface of the case 12. In the example shown in FIG. 2, the identifier 19 is displayed on a surface of a front wall 12C of the case 12. The identifier 19 includes a barcode 19A. The barcode 19A is a one-dimensional image indicating information for identifying the magnetic tape cartridge 10 (for example, a serial number for managing the magnetic tape cartridge 10, given by a user). The identifier 19 is an example of an "identifier" according to the technique of the present disclosure.

In the example shown in FIG. 2, the identifier 19 includes a character string 19B. The character string 19B is a character string (for example, a character string including a combination of alphanumeric characters) indicating information for identifying the magnetic tape cartridge 10. The character string 19B is displayed, so that the user can visually identify the magnetic tape cartridge 10.

Although the identifier 19 is displayed on the case 12, for example, in such a manner that a label on which the barcode 19A and the character string 19B are printed is attached to the surface of the case 12, this is merely an example. The identifier 19 may be printed directly on the surface of the case 12.

Figure 3:
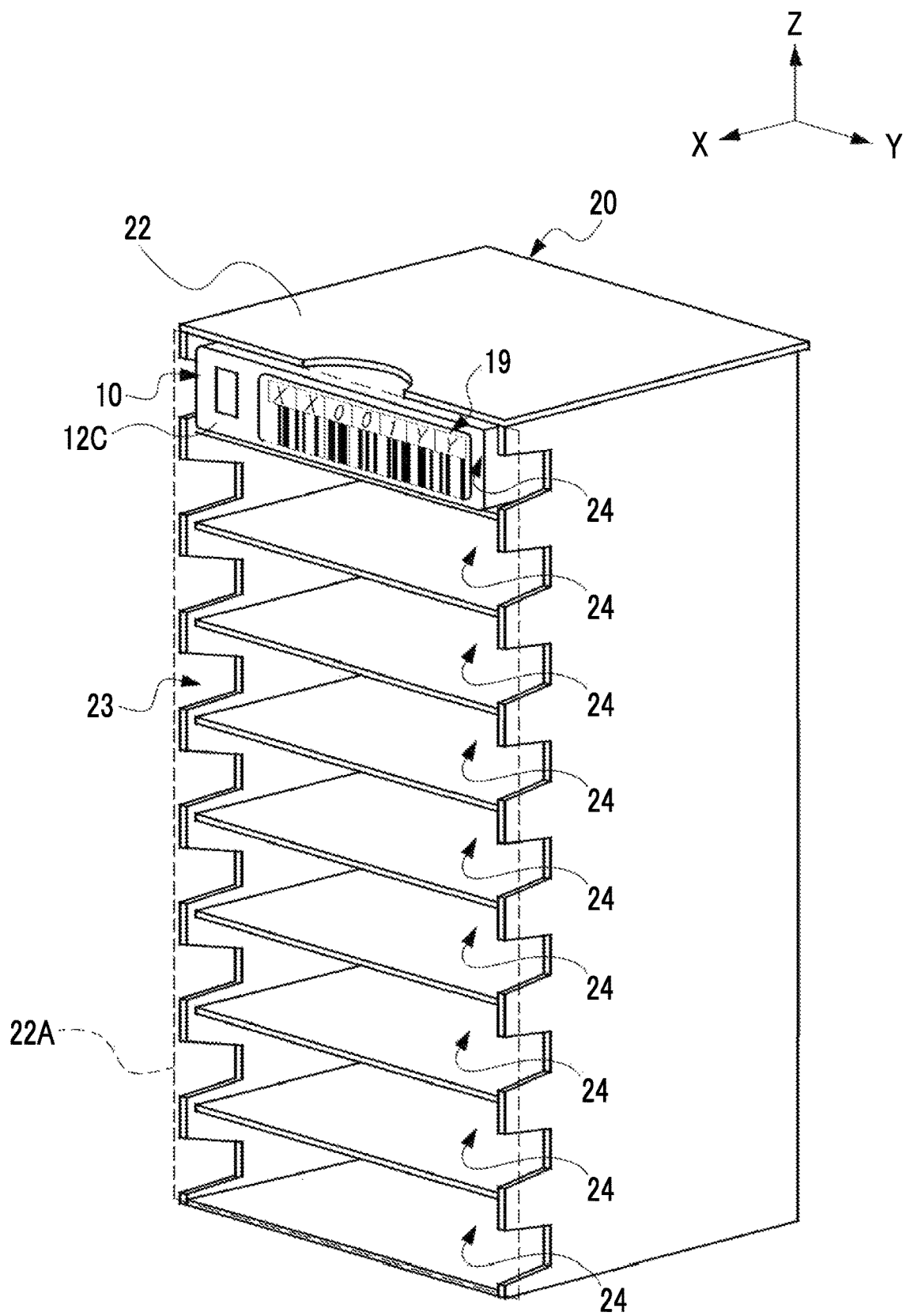
FIG. 3 is a schematic perspective view showing an example of an appearance of a holder according to the first embodiment.

As shown in FIG. 3 as an example, the magnetic tape cartridge 10 is stored in a holder 20. The holder 20 is a cartridge magazine that can be repeatedly used while refilling the magnetic tape cartridge 10. Here, the holder 20 is an example of a "holder" according to the technique of the present disclosure, and the cartridge magazine is an example of a "magazine for a magnetic tape cartridge" according to the technique of the present disclosure.

Hereinafter, for convenience of description, a +X direction that is one direction of an X axis shown in FIG. 3 is referred to as a front direction of the holder 20, and a side in the front direction of the holder 20 is referred to as a front side of the holder 20. In the following description on the structure of the holder 20, "front" indicates the front side of the holder 20.

Hereinafter, for convenience of description, a −X direction that is the other direction (that is, a direction opposite to the +X direction) of the X axis shown in FIG. 3 is referred to as a rear direction of the holder 20, and a side in the rear direction of the holder 20 is referred to as a rear side of the holder 20. In the following description on the structure of the holder 20, "rear" indicates the rear side of the holder 20.

Hereinafter, for convenience of description, a +Y direction that is one direction of a Y axis (that is, an axis perpendicular to the X axis) shown in FIG. 3 is referred to as a right direction of the holder 20, and a side in the right direction of the holder 20 is referred to as a right side of the holder 20. In the following description on the structure of the holder 20, "right" indicates the right side of the holder 20.

Hereinafter, for convenience of description, a −Y direction that is the other direction (that is, a direction opposite to the +Y direction) of the Y axis shown in FIG. 3 is referred to as a left direction of the holder 20, and a side in the left direction of the holder 20 is referred to as a left side of the holder 20. In the following description on the structure of the holder 20, "left" indicates the left side of the holder 20.

Hereinafter, for convenience of description, a +Z direction that is one direction of a Z axis (that is, an axis perpendicular to the X axis and the Y axis) shown in FIG. 3 is referred to as an up direction of the holder 20, and a side in the up direction of the holder 20 is referred to as an upside of the holder 20. In the following description on the structure of the holder 20, "up" indicates the upside of the holder 20.

Hereinafter, for convenience of description, a −Z direction that is the other direction (that is, a direction opposite to the +Z direction) of the Z axis shown in FIG. 3 is referred to as a down direction of the holder 20, and a side in the down direction of the holder 20 is referred to as a downside of the holder 20. In the following description on the structure of the holder 20, "down" indicates the downside of the holder 20.

The holder 20 has a housing structure 22 configured to accommodate a plurality of magnetic tape cartridges 10 inside. An opening portion 23 is formed in the housing structure 22. The holder 20 holds a plurality of magnetic tape cartridges 10 in such a manner that a plurality of magnetic tape cartridges 10 are able to be put in and out through the opening portion 23. The opening portion 23 is an example of an "exposure region" according to the technique of the present disclosure.

The opening portion 23 is formed by opening one surface in the housing structure 22 of the holder 20 with respect to an outside. In the example shown in FIG. 3, the opening portion 23 is formed in the front surface of the holder 20, that is, a front surface 22A in the housing structure 22. The magnetic tape cartridge 10 is put in and out of the holder 20 through the opening portion 23. Although the housing structure 22 is formed of, for example, resin, this is merely an example, and the housing structure 22 may be formed of, for example, metal or may be formed by combining resin and metal.

The magnetic tape cartridge 10 is stored in the holder 20 in a state in which the identifier 19 is readable. The identifier 19 is displayed on a surface of the case 12 on the side of the opening portion 23. Here, the surface of the case 12 on the side of the opening portion 23 indicates a surface that is exposed to the outside of the holder 20 through the opening portion 23.

In the example shown in FIG. 3, the magnetic tape cartridge 10 is stored in a state in which the front wall 12C on which the identifier 19 is displayed is exposed to the outside of the holder 20. More specifically, the identifier 19 is displayed on the surface of the front wall 12C that is the surface of the case 12 on the side of the opening portion 23. The magnetic tape cartridge 10 is stored in the holder 20 in such a manner that the front wall 12C turns toward the opening portion 23.

The holder 20 has a plurality of storage portions 24 (that is, cavities). A plurality of storage portions 24 are formed in such a manner that the inside of the holder 20 is partitioned into a plurality of portions along one direction (in the example shown in FIG. 3, the Z direction). In the example shown in FIG. 3, the holder 20 having a rectangular parallelepiped shape is partitioned into nine stages along a longitudinal direction (in the example shown in FIG. 3, the Z direction), whereby nine storage portions 24 are formed.

Figure 4:
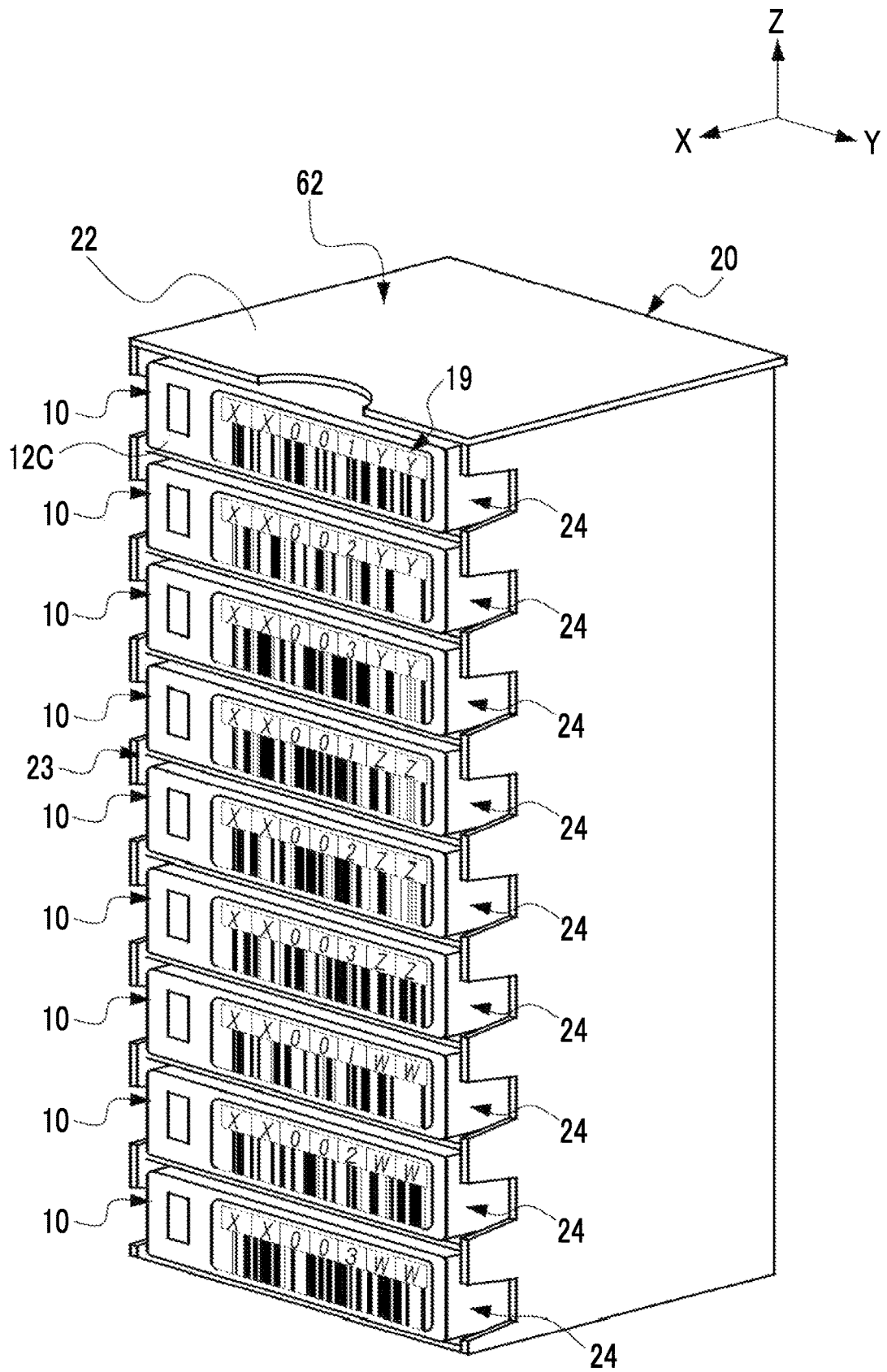
FIG. 4 is a schematic perspective view showing an example of an appearance of a cartridge set according to the first embodiment.

In the present first embodiment, as shown in FIG. 4 as an example, a cartridge set 62 is used. The cartridge set 62 is formed with the holder 20 and a plurality of magnetic tape cartridges 10 that are held by the holder 20. That is, the cartridge set 62 is a single individual formed in such a manner that a plurality of magnetic tape cartridges 10 are stored in the holder 20. In the example shown in FIG. 4, nine magnetic tape cartridges 10 are stored with respect to the nine storage portions 24. The magnetic tape cartridges 10 are stored in the respective storage portions 24 one by one, such that the front wall 12C is exposed from the opening portion 23. With this, a plurality of magnetic tape cartridges 10 are exposed from the opening portion 23. Specifically, each front wall 12C of a plurality of magnetic tape cartridges 10 are exposed from the opening portion 23. Since the identifier 19 is displayed on the surface of the front wall 12C, the identifier 19 of each magnetic tape cartridge 10 is exposed from the opening portion 23 in a visible state.

By the way, in a case of transporting the magnetic tape cartridge 10, it is necessary to protect the magnetic tape cartridge 10 against an impact, dirt, and the like. For this reason, the magnetic tape cartridges 10 are packaged one by one. In this case, in a case where a plurality of magnetic tape cartridges 10 are loaded into the magnetic tape library 26 (see FIG. 6) at one time using the holder 20, first, work of removing packaging materials of a plurality of magnetic tape cartridges 10 is required. Then, the magnetic tape cartridges 10 with the packaging materials removed are stored in the holder 20. In this way, in a case of packaging a plurality of magnetic tape cartridges 10 one by one, packaging work and removing work of the packaging material are complicated.

Figure 5:
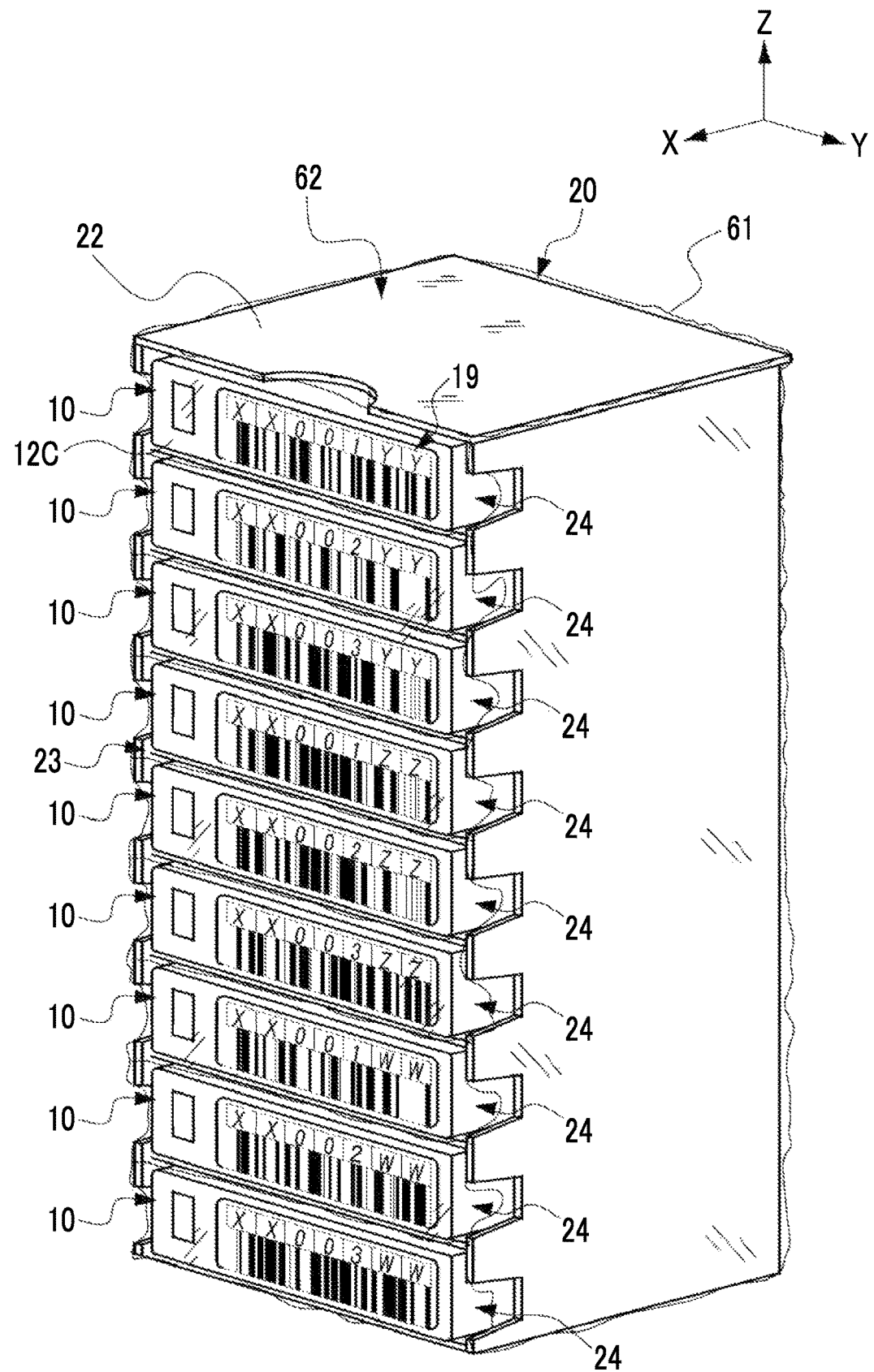
FIG. 5 is a schematic perspective view showing an example of an appearance in which the cartridge set according to the first embodiment is covered with a coating material.

Accordingly, in view of such a situation, in the present first embodiment, as shown in FIG. 5 as an example, at least the opening portion 23 of the holder 20 is covered with a coating material 61. In the example shown in FIG. 5, the whole of the cartridge set 62 is covered with the coating material 61. The coating material 61 is an example of a "coating material" according to the technique of the present disclosure, and the cartridge set 62 is an example of a "single individual" according to the technique of the present disclosure.

The coating material 61 covers the whole of the cartridge set 62 to protect the magnetic tape cartridges 10 against dirt, such as dust, from the outside, to absorb an impact from the outside, or to suppress dropping-out of the magnetic tape cartridges 10. The coating material 61 is a film and contracts in a state of covering the whole of the cartridge set 62. With this, the coating material 61 is closely attached to the cartridge set 62. As a result, dropping-out of the magnetic tape cartridges 10 from the holder 20 is suppressed. Although an example of an aspect where the coating material 61 is closely attached to the holder 20 is thermal contraction, this is merely an example. For example, the coating material 61 may be put around the cartridge set 62 to be closely attached to the cartridge set 62.

The coating material 61 covers the cartridge set 62 in a state in which the identifier 19 is readable. The coating material 61 is formed of a material that transmits visible light. For example, the coating material 61 is a film formed of polyethylene. A thickness and a physical property (for example, stretchability) of the coating material 61 may be appropriately set within a scope without departing from the object of the technique of the present disclosure, and is not particularly limited.

In the example shown in FIG. 5, although the coating material 61 covers the whole of the cartridge set 62, this is merely an example. The coating material 61 may cover at least the opening portion 23, and for example, an aspect where the coating material 61 covers only the front surface 22A (see FIG. 3) of the holder 20 may be made.

Figure 6:
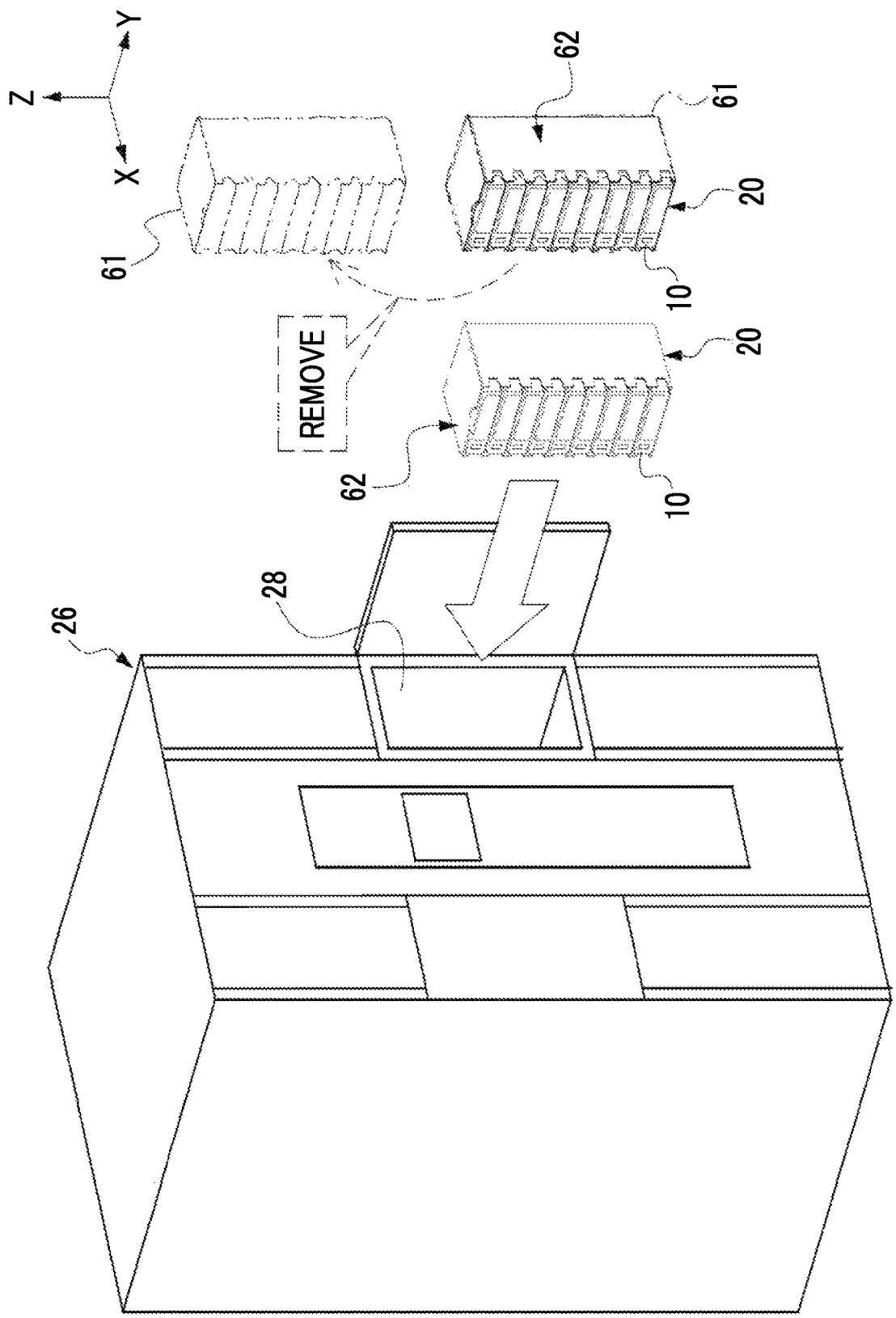
FIG. 6 is a schematic view showing an example of an aspect where the cartridge set according to the first embodiment is loaded into a magnetic tape library.

As shown in FIG. 6 as an example, the cartridge set 62 is loaded into the magnetic tape library 26. That is, the holder 20 is a magazine for a magnetic tape cartridge formed to be loadable into the magnetic tape library 26, and is loaded into the magnetic tape library 26 in a state of holding a plurality of magnetic tape cartridges 10.

In a case where the cartridge set 62 is loaded into the magnetic tape library 26, first, the magnetic tape cartridge 10 included in the cartridge set 62 is identified. The magnetic tape cartridge 10 is stored in the holder 20 in a state in which the identifier 19 is readable. The coating material 61 covers the holder 20 in a state in which the identifier 19 is readable. With this, even before the coating material 61 is removed, the magnetic tape cartridge 10 can be identified.

For example, the user reads the barcode 19A included in the identifier 19 using a barcode reader to identify each magnetic tape cartridge 10 included in the cartridge set 62. For example, the user visually identifies each magnetic tape cartridge 10 included in the cartridge set 62 based on the character string 19B included in the identifier 19. After the magnetic tape cartridge 10 is identified, the coating material 61 that covers the cartridge set 62 is removed.

A slot 28 is formed in the magnetic tape library 26. The cartridge set 62 with the coating material 61 removed is loaded in the magnetic tape library 26 through the slot 28.

Figure 7:
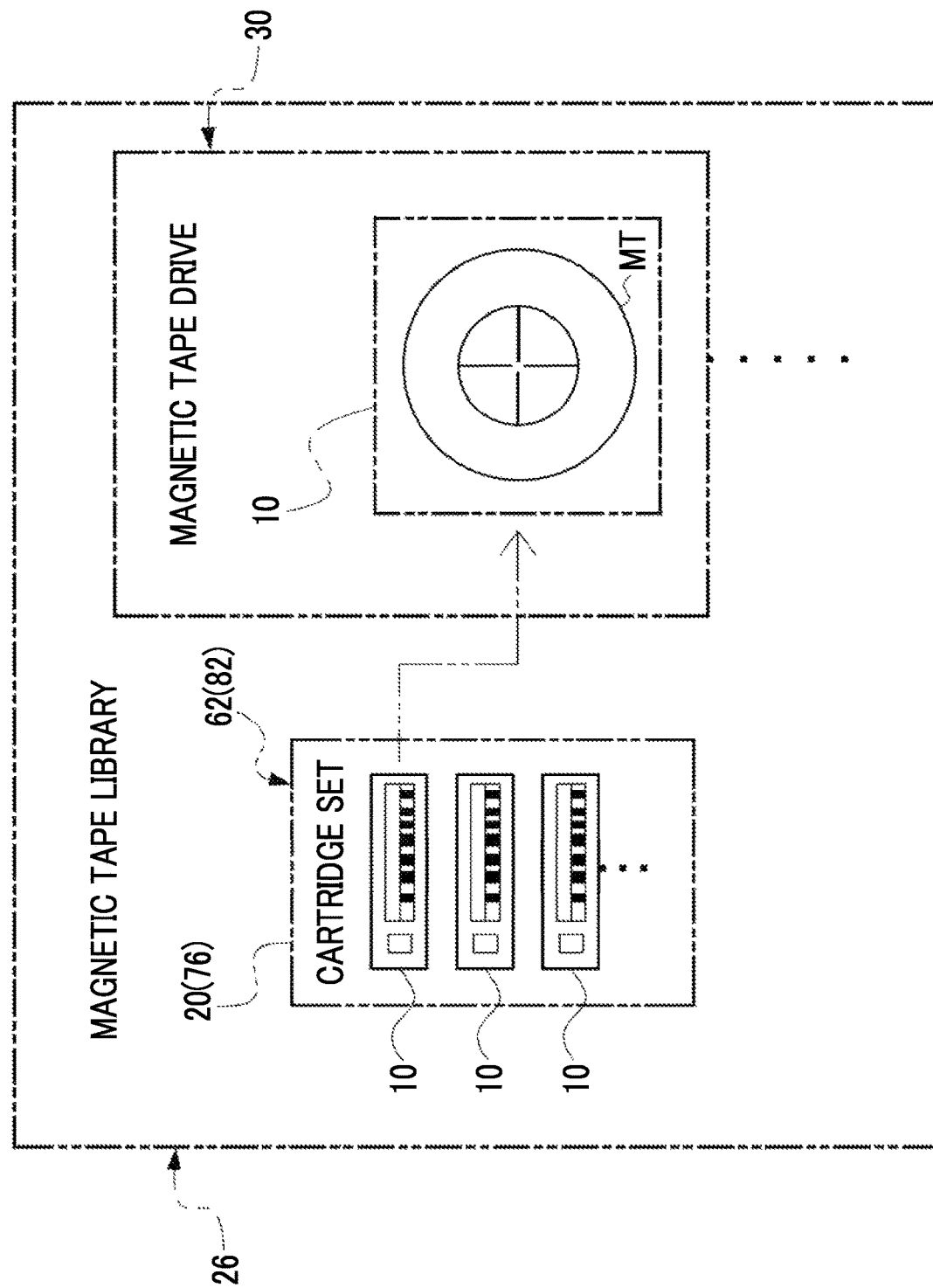
FIG. 7 is a schematic configuration diagram showing an example of a hardware configuration of a magnetic tape library according to the first and second embodiments.

As shown in FIG. 7 as an example, a plurality of magnetic tape drives 30 are provided in the magnetic tape library 26. The magnetic tape cartridge 10 is taken out from the holder 20 by a robot arm (not shown) or the like and is loaded into the designated magnetic tape drive 30. The identifier 19 of the magnetic tape cartridge 10 is read by a reading device (not shown), so that the magnetic tape cartridge 10 that is loaded into the magnetic tape drive 30 is identified.

The magnetic tape drive 30 is a device that pulls out the magnetic tape MT from the magnetic tape cartridge 10 and reads and writes information with respect to the pulled-out magnetic tape MT using a reading and writing head (not shown) by a linear serpentine system. In the present first embodiment, reading and writing of information indicate, in other words, recording and reproduction of information.

By the way, in a case of storing or transporting a plurality of magnetic tape cartridges 10 in a lump, a plurality of magnetic tape cartridges 10 are accommodated in receptacles (for example, a receptacle formed of plastic). Then, a plurality of receptacles in which a plurality of magnetic tape cartridges 10 are respectively accommodated are stacked in any stages along a vertical direction. In this case, the receptacle positioned in a lower stage receives a load of the receptacle positioned in an upper stage. At the time of transporting, the receptacle positioned in the lower stage receives a greater load due to vibration that is generated in an up-down direction. In this way, in a case where a large load is applied to the receptacle positioned in the lower stage from above, the case 12 of the magnetic tape cartridge 10 in the receptacle positioned in the lower stage may be damaged or the identifier 19 may be damaged. Furthermore, in a case where a large load is applied to the receptacle positioned in the lower stage from above, not only the case 12 and the identifier 19 may be damaged, but also the magnetic tape MT in the magnetic tape cartridge 10 may be damaged. In particular, in recent years, with high density of a data band in the width direction of the magnetic tape MT, in a case where both end portions of the magnetic tape MT in the width direction are damaged, normal reading and writing of data may not be performed with respect to the magnetic tape MT.

Figure 8:
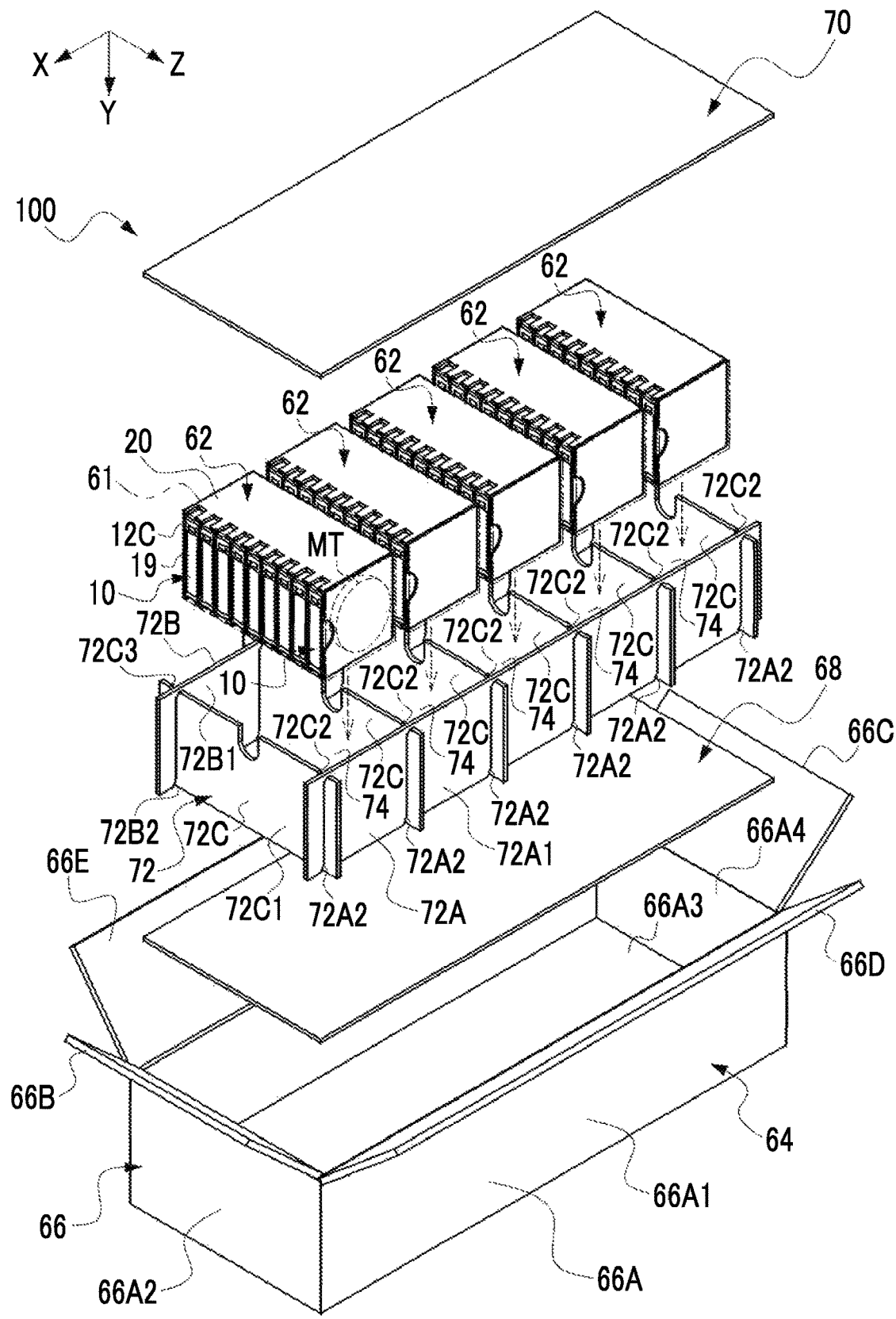
FIG. 8 is an exploded perspective view showing an example of an appearance of a package according to the first embodiment.

Accordingly, in view of such a situation, in the present first embodiment, a plurality of cartridge sets 62 are packaged by a corrugated cardboard 64 in a state of being individually covered with the coating material 61 (see FIG. 8). Examples of types of the corrugated cardboard 64 include a single-sided corrugated cardboard, a double-sided corrugated cardboard, a double-walled double-sided corrugated cardboard, and a triple-walled double-sided corrugated cardboard. Here, although the corrugated cardboard 64 is illustrated, this is merely an example, and other packaging materials, such as polystyrene foam, may be used, instead of the corrugated cardboard 64.

FIG. 8 shows an example of a configuration of a package 100. The package 100 comprises a plurality of cartridge sets 62 and the corrugated cardboard 64. The package 100 is an example of a "package" according to the technique of the present disclosure.

The corrugated cardboard 64 comprises a corrugated cardboard box 66, a first corrugated cardboard plate 68, a second corrugated cardboard plate 70, and a partition structure 72.

The corrugated cardboard box 66 is a 0201 type corrugated cardboard box. The corrugated cardboard box 66 has a corrugated cardboard box body 66A. The corrugated cardboard box body 66A is formed in a rectangular parallelepiped shape, and has a length surface 66A1 that is a side surface in a longitudinal direction (in the example shown in FIG. 8, the X direction) and a width surface 66A2 that is a side surface in a transverse direction (in the example shown in FIG. 8, the Z direction). The corrugated cardboard box body 66A has a flat plate-shaped bottom 66A3. An opening 66A4 is formed on an upside of the corrugated cardboard box body 66A in a vertical direction.

The corrugated cardboard box body 66A is provided with inner flaps 66B and 66C and outer flaps 66D and 66E. The inner flap 66B is provided on one side of two sides facing each other in the longitudinal direction (in the example shown in FIG. 8, the X direction) of the corrugated cardboard box body 66A among four sides that define the opening 66A4, and the inner flap 66C is provided on the other side. The outer flap 66D is provided on one side of two sides facing each other in the transverse direction (in the example shown in FIG. 8, the Z direction) of the corrugated cardboard box body 66A among the four sides that define the opening 66A4, and the outer flap 66E is provided on the other side.

The first corrugated cardboard plate 68 is formed in the same shape as the bottom 66A3. The size of the first corrugated cardboard plate 68 is a size slightly smaller than the bottom 66A3. The first corrugated cardboard plate 68 is put in the corrugated cardboard box body 66A from the opening 66A4 and is laid on the bottom 66A3.

The partition structure 72 has a first partition member 72A and a second partition member 72B. The first partition member 72A and the second partition member 72B are formed in a long plate shape. The first partition member 72A has a wide surface 72A1, and the second partition member 72B has a wide surface 72B1.

A plurality of slits 72A2 are formed in the first partition member 72A. The slits 72A2 are opened on a downside in the vertical direction. A plurality of slits 72A2 are formed at regular intervals along a longitudinal direction (in the example shown in FIG. 8, the X direction) of the first partition member 72A. The number of slits 72A2 is the number of cartridge sets 62 accommodated in the corrugated cardboard box 66 plus one. In the example shown in FIG. 8, six slits 72A2 are formed at regular intervals along the longitudinal direction of the first partition member 72A.

A plurality of slits 72B2 are formed in the second partition member 72B. The slits 72B2 are opened on a downside in the vertical direction. A plurality of slits 72B2 are formed at regular intervals along a longitudinal direction (in the example shown in FIG. 8, the X direction) of the second partition member 72B. The number of slits 72B2 is the number of cartridge sets 62 accommodated in the corrugated cardboard box 66 plus one. In the example shown in FIG. 8, six slits 72B2 are formed at regular intervals along the longitudinal direction of the second partition member 72B.

The partition structure 72 has a plurality of third partition members 72C. The third partition members 72C are formed in a long plate shape. Each of the third partition members 72C has a wide surface 72C1. In the third partition member 72C, slits 72C2 and 72C3 are formed. The slits 72C2 and 72C3 are formed at an interval along a longitudinal direction (in the example shown in FIG. 8, the Z direction) of the third partition member 72C. The first partition member 72A and the second partition member 72B are disposed in orientations in which the surface 72A1 and the surface 72B1 overlap each other in the Z direction shown in FIG. 8. In this state, out of the slits 72A2 and 72B2 in a positional relationship facing each other between the first partition member 72A and the second partition member 72B, the slit 72A2 is inserted into the slit 72C2, and the slit 72B2 is inserted into the slit 72C3. With this, the third partition member 72C is fitted to the first partition member 72A and the second partition member 72B. In the same manner, the remaining third partition members 72C are fitted to the first partition member 72A and the second partition member 72B. With this, the partition structure 72 is formed with the first partition member 72A, the second partition member 72B, and a plurality of third partition members 72C.

In the partition structure 72 formed in this way, one end portion in the longitudinal direction (in the example shown in FIG. 8, the Z direction) of the third partition member 72C fitted to the first partition member 72A projects from each slit 72A2 of the first partition member 72A. The other end portion in the longitudinal direction of the third partition member 72C fitted to the second partition member 72B projects from each slit 72B2 of the second partition member 72B. Furthermore, one end portion in the longitudinal direction (in the example shown in FIG. 8, the X direction) of the first partition member 72A fitted to a plurality of third partition members 72C projects from the slit 72C2 of the third partition member 72C positioned at one end among a plurality of third partition members 72C arranged along the longitudinal direction (in the example shown in FIG. 8, the X direction) of the first partition member 72A and the second partition member 72B. The other end portion in the longitudinal direction of the first partition member 72A fitted to a plurality of third partition members 72C projects from the slit 72C2 of the third partition member 72C positioned at the other end among a plurality of third partition members 72C arranged in the longitudinal direction of the first partition member 72A and the second partition member 72B. Furthermore, one end portion in the longitudinal direction of the second partition member 72B fitted to a plurality of third partition members 72C projects from the slit 72C3 of the third partition member 72C positioned at one end among a plurality of third partition members 72C arranged along the longitudinal direction of the first partition member 72A and the second partition member 72B. The other end portion in the longitudinal direction of the second partition member 72B fitted to a plurality of third partition members 72C projects from the slit 72C3 of the third partition member 72C positioned at the other end among a plurality of third partition members 72C arranged along the longitudinal direction of the first partition member 72A and the second partition member 72B. In the partition structure 72, such projecting portions are hereinafter referred to as "first projecting portions".

The partition structure 72 is press-fitted into the corrugated cardboard box body 66A while bringing the first projecting portions into contact with the inner surface of the corrugated cardboard box body 66A in a state in which the surfaces 72A1 and 72B1 are set parallel to the length surface 66A1 and in a state in which the surface 72C1 is set parallel to the width surface 66A2. The first projecting portions of the partition structure 72 press-fitted into the corrugated cardboard box body 66A function as a buffer member that absorbs an impact from the side of the corrugated cardboard box body 66A.

In this way, in a case where the partition structure 72 is press-fitted into the corrugated cardboard box body 66A, in the corrugated cardboard box body 66A, the first partition member 72A and the second partition member 72B are disposed in a state in which the surfaces 72A1 and 72B1 are parallel to each other. In the corrugated cardboard box body 66A, a plurality of third partition members 72C are disposed in a state in which the surfaces 72C1 cross the surfaces 72A1 and 72B1 (here, a state in which the surfaces 72C1 are perpendicular to the surfaces 72A1 and 72B1, as an example). As a result, a plurality of accommodation regions 74 are formed with the partition structure 72. A plurality of accommodation regions 74 are divided in one direction by the partition structure 72. Here, one direction indicates the longitudinal direction (in the example shown in FIG. 8, the X direction) of the corrugated cardboard box body 66A. In the example shown in FIG. 8, five accommodation regions 74 are formed along one direction. Here, although a case where the number of accommodation regions 74 is five is illustrated, the number of accommodation regions 74 may be less than five or may be six or more.

Each of a plurality of accommodation regions 74 is a region (for example, a rectangular parallelepiped space) divided by the partition structure 72. A plurality of cartridge sets 62 (that is, a plurality of holders 20 in a state of each holding a plurality of magnetic tape cartridges 10) are accommodated in a plurality of accommodation regions 74 in such a manner that the cartridge sets 62 are able to be put in and out. The partition structure 72 is an example of a "partition structure" according to the technique of the present disclosure, and a plurality of accommodation regions 74 are an example of "a plurality of accommodation regions" according to the technique of the present disclosure.

The cartridge set 62 covered with the coating material 61 is accommodated in the accommodation region 74 in a state in which the right side (that is, the side of the +Y direction) of the holder 20 turns toward the first corrugated cardboard plate 68 in the corrugated cardboard box body 66A. In other words, the holder 20 in which a plurality of magnetic tape cartridges 10 are stored is accommodated in the accommodation region 74 in a posture in which the magnetic tape cartridges 10 are set in a portrait orientation. Here, the portrait orientation indicates an orientation in which both ends of the magnetic tape MT in the width direction (that is, the Z direction) are positioned along a direction crossing (here, as an example, a direction perpendicular to) a direction in which the holder 20 is put in and out of the accommodation region 74.

In a case where the cartridge set 62 is accommodated in the accommodation region 74 in a posture in which a plurality of magnetic tape cartridges 10 are set in the portrait orientation, the magnetic tape MT in the magnetic tape cartridge 10 is difficult to be crushed along the width direction with respect to pressure applied to the cartridge set 62 from the +Y direction. Since the cartridge set 62 is accommodated in the accommodation region 74 in a state in which the right side of the holder 20 turns toward the first corrugated cardboard plate 68 in the corrugated cardboard box body 66A, the front wall 12C of the magnetic tape cartridge 10 held by the holder 20 faces the third partition member 72C in the accommodation region 74. With this, the identifier 19 displayed on the surface of the front wall 12C is protected by the third partition member 72C.

In this way, after the cartridge set 62 is accommodated in each accommodation region 74 partitioned by the partition structure 72 in the corrugated cardboard box body 66A in a posture in which a plurality of magnetic tape cartridges 10 are set in the portrait orientation, the partition structure 72 in which the cartridge set 62 is accommodated is covered with the second corrugated cardboard plate 70 from the upside in the vertical direction (in the example shown in FIG. 8, the side of the −Y direction). Then, the inner flaps 66B and 66C and the outer flaps 66D and 66E are closed, and a gap between the outer flaps 66D and 66E is closed by a pressure-sensitive adhesive tape or the like.

Figure 9:
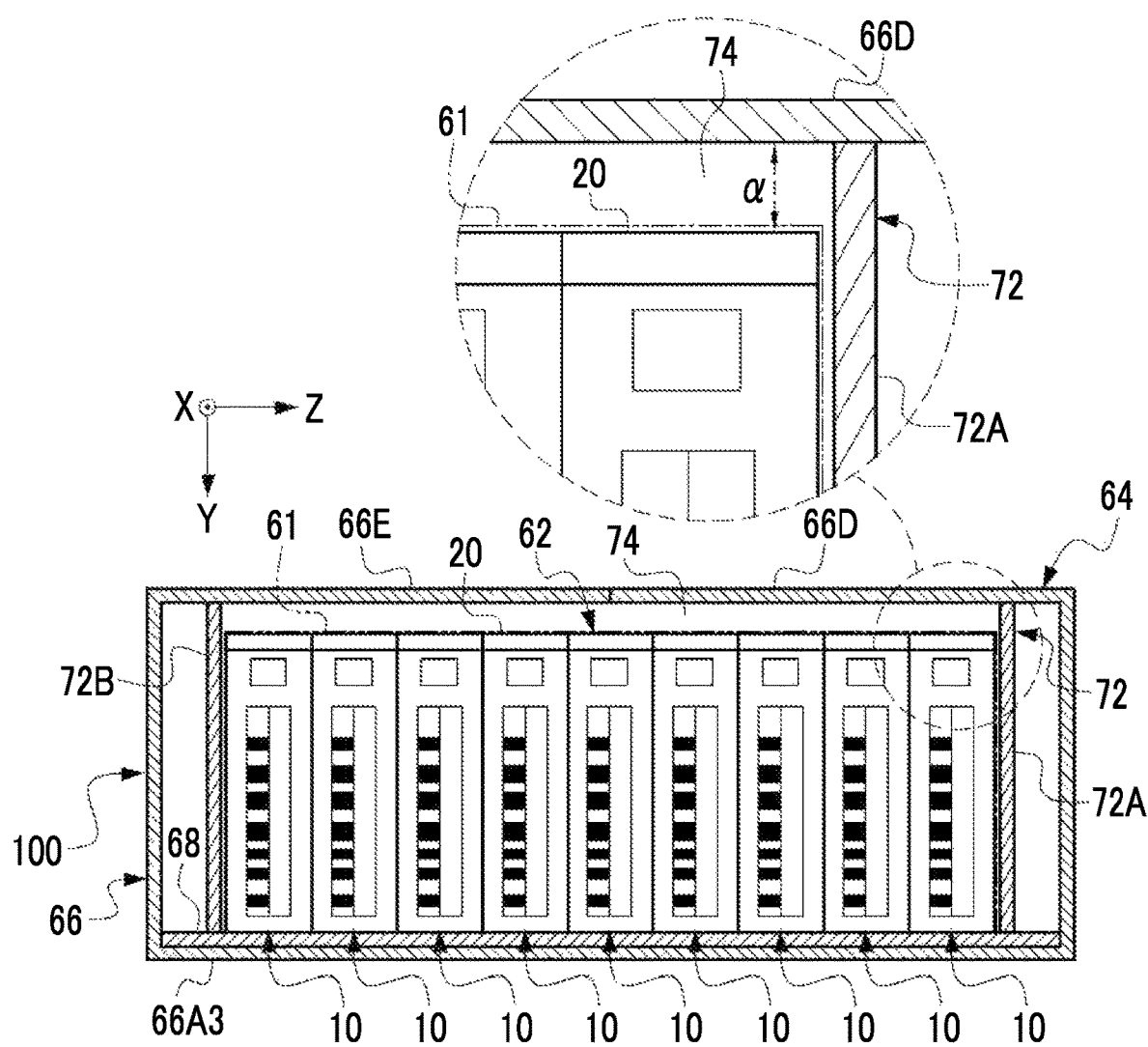
FIG. 9 is a schematic cross-sectional view showing an example of an aspect in cross section of the package according to the first embodiment.

FIG. 9 shows an example of an aspect in cross section where a plurality of cartridge sets 62 are accommodated in the corrugated cardboard box 66 in the above-described manner. In the example shown in FIG. 9, to facilitate understanding of the technique of the present disclosure, the second corrugated cardboard plate 70 is not shown.

As shown in FIG. 9 as an example, in the corrugated cardboard box 66, in a state in which the cartridge set 62 is accommodated in the accommodation region 74 in the above-described manner, a height of the partition structure 72 (that is, a length of the partition structure 72 in the vertical direction) is higher than a height of the holder 20 (that is, a length of the holder 20 in the Y direction). Specifically, for example, in a state in which the cartridge set 62 is accommodated in the accommodation region 74 in the above-described manner, a height of the first partition member 72A, a height of the second partition member 72B, and heights of all third partition members 72C are higher than the height of the holder 20. The partition structure 72 has strength capable of bearing a given level of load (for example, a load of tens of kilograms to hundreds of kilograms) from the upside in the vertical direction (in the example shown in FIG. 9, the side of the −Y direction). That is, the partition structure 72 has a given level of load bearing capable of maintaining a difference a between the height of the partition structure 72 and the height of the holder 20.

Next, the operations of the package 100 will be described.

Figure 10:
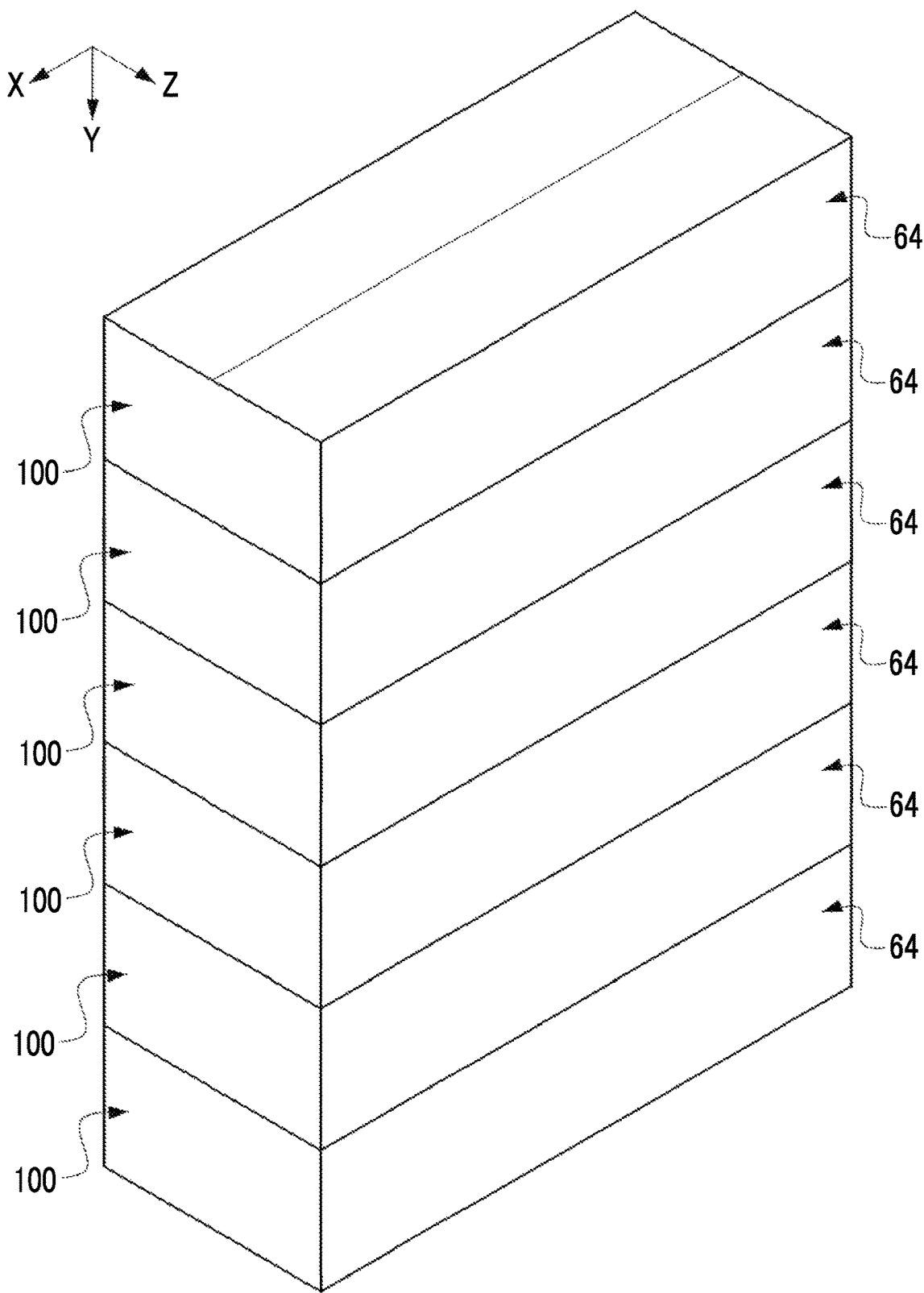
FIG. 10 is a schematic perspective view showing an example of an aspect where a plurality of packages according to the first embodiment are stacked.

The first corrugated cardboard plate 68 is laid on the bottom 66A3 of the corrugated cardboard box body 66A. In the corrugated cardboard box body 66A, the partition structure 72 is placed on the first corrugated cardboard plate 68. The partition structure 72 has a plurality of accommodation regions 74 divided in one direction, and the cartridge set 62 is accommodated in each accommodation region 74. The cartridge set 62 is accommodated in the accommodation region 74 in a posture in which a plurality of magnetic tape cartridges 10 are set in the portrait orientation. After the cartridge set 62 is accommodated in each accommodation region 74, the partition structure 72 in which the cartridge set 62 is accommodated is covered with the second corrugated cardboard plate 70 from the upside in the vertical direction. Then, the inner flaps 66B and 66C and the outer flaps 66D and 66E are closed, and a gap between the outer flaps 66D and 66E is closed by a pressure-sensitive adhesive tape or the like. The packages 100 configured in this manner are stacked over a plurality of stages at the time of storage and/or transporting as shown in FIG. 10 as an example. In this case, an aggregate of the packages 100 obtained by stacking a plurality of packages 100 in layers is shrink-packaged with, for example, a film, and is stored or transported as a single individual.

Figure 11:
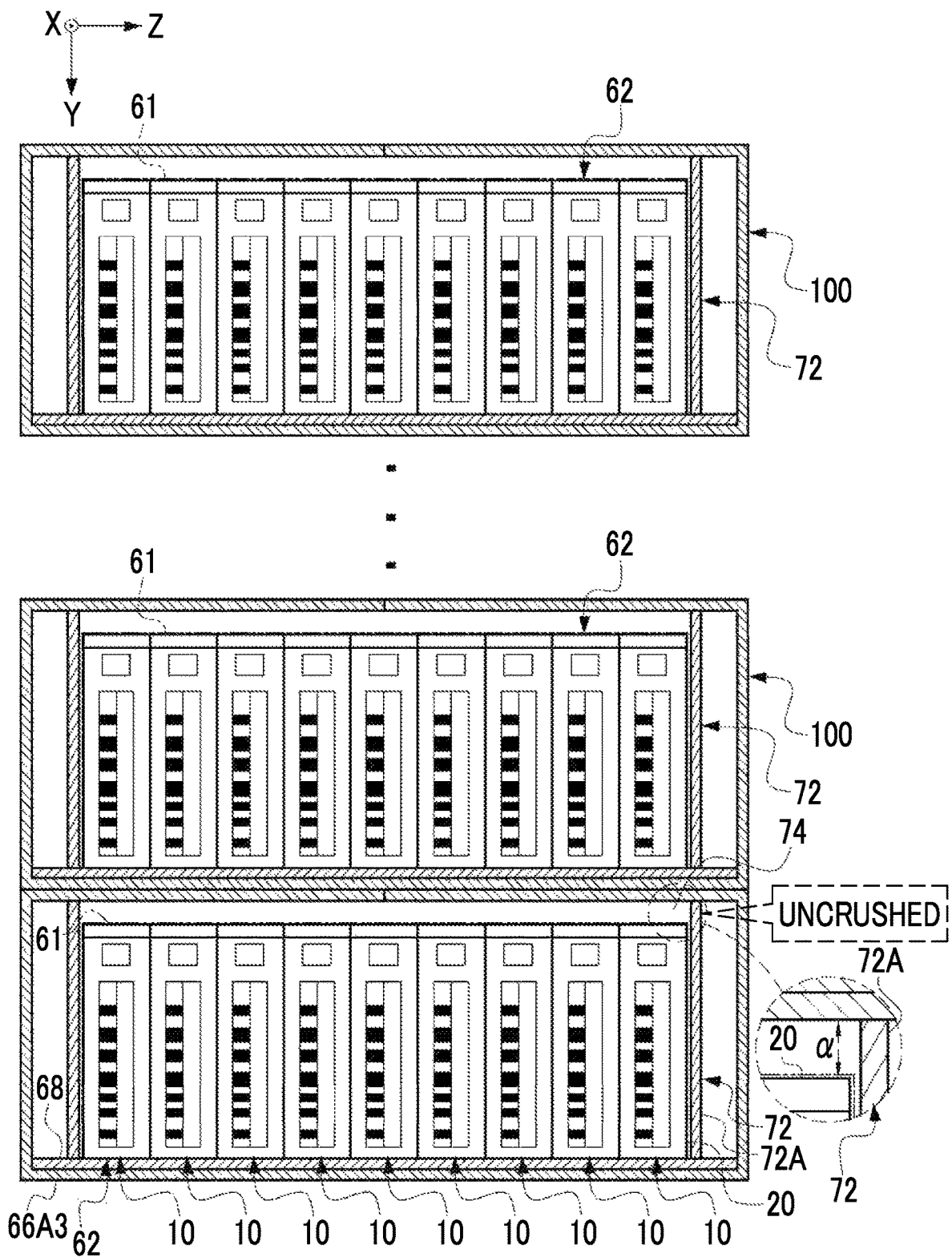
FIG. 11 is a schematic cross-sectional view showing an example of an aspect in cross section of a plurality of packages in a state in which a plurality of packages according to the first embodiment are stacked.

In a state in which the cartridge set 62 is accommodated in the accommodation region 74, the height of the partition structure 72 is higher than the height of the holder 20 (that is, the length of the holder 20 in the Y direction), and the partition structure 72 has a given level of load bearing. Accordingly, even in a case where the package 100 is stacked over a plurality of stages, as shown in FIG. 11 as an example, the partition structure 72 in the package 100 positioned in a lower stage (in the example shown in FIG. 11, the package 100 in the lowermost stage) receives a load from one or more packages 100 positioned in an upper stage (in the example shown in FIG. 11, all packages 100 positioned in a stage higher than the package 100 in the lowermost stage), is not crushed, and maintains the difference a. That is, since the load from the upside in the vertical direction (in the example shown in FIG. 11, the side of the −Y direction) is applied to the partition structure 72 in the package 100 positioned in a lower stage, the cartridge set 62 accommodated in the partition structure 72 does not receive the load from the upside in the vertical direction. It is possible to suppress damage to the magnetic tape cartridge 10 in the package 100 due to the load from the upside in the vertical direction.

Also in regard to a plurality of magnetic tape cartridges 10 in a plurality of cartridge sets 62 that are accommodated in a plurality of accommodation regions 74 divided in one direction, it is possible to suppress damage due to the load from the upside in the vertical direction.

Since the cartridge set 62 is accommodated in the accommodation region 74 in a posture in which a plurality of magnetic tape cartridges 10 are set in the portrait orientation, the magnetic tape MT in the cartridge set 62 accommodated in the package 100 positioned in a lower stage does not receive a load in the width direction of the magnetic tape MT from the package 100 positioned in an upper stage. That is, the magnetic tape MT in the cartridge set 62 accommodated in the package 100 does not receive the load from the upside in the vertical direction. Accordingly, it is possible to suppress damage to both end portions of the magnetic tape MT in the width direction due to the load from the upside in the vertical direction. The coating material 61 covers at least the opening portion 23 in the holder 20. Therefore, according to this configuration, packaging work of the magnetic tape cartridge 10 or removing work of the coating material 61 is facilitated. For example, packaging work of the magnetic tape cartridge 10 or removing work of the coating material 61 is facilitated, compared to a case where a plurality of magnetic tape cartridges 10 are packaged separately.

The whole of the cartridge set 62 is covered with the coating material 61. Therefore, according to this configuration, packaging work of the magnetic tape cartridge 10 or removing work of the coating material 61 is facilitated. For example, packaging work of the magnetic tape cartridge 10 or removing work of the coating material 61 is facilitated, compared to a case where a plurality of magnetic tape cartridges 10 are packaged separately.

The coating material 61 is a film. Therefore, according to this configuration, the cartridge sets 62 having various shapes and sizes can be covered with the coating material 61, compared to a case where the cartridge set 62 is covered with a container having given shape and size.

The coating material 61 covers the holder 20 in a state in which the identifier 19 is readable. Therefore, according to this configuration, the magnetic tape cartridge 10 is easily identified even in a state of being covered with the coating material 61. For example, the magnetic tape cartridge 10 is easily identified even in a state of being covered with the coating material 61, compared to a case where the identifier 19 is not read through the coating material 61.

The coating material 61 is formed of a material that transmits visible light. Therefore, according to this configuration, the magnetic tape cartridge 10 can be visually identified.

In the package 100 according to the present embodiment, the holder 20 is a cartridge magazine. Therefore, according to this configuration, a plurality of magnetic tape cartridges 10 can be loaded into the magnetic tape library 26 in a lump. The holder 20 can be repeatedly used while refilling the magnetic tape cartridge 10.

The identifier 19 is displayed on the surface in the case 12 of the magnetic tape cartridge 10 on the side of the opening portion 23 in the holder 20. Therefore, according to this configuration, the magnetic tape cartridge 10 stored in the holder 20 is easily identified. For example, the magnetic tape cartridge 10 stored in the holder 20 is easily identified, compared to a case where an opening that exposes identifier 19 is provided in addition to the opening portion 23 in the holder 20.

In the package 100 according to the present embodiment, the identifier 19 includes the barcode 19A. Therefore, according to this configuration, the magnetic tape cartridge 10 is easily identified. For example, the magnetic tape cartridge 10 is easily identified, compared to a case where the identifier 19 is composed only of a character string.

Second Embodiment

Figure 12:
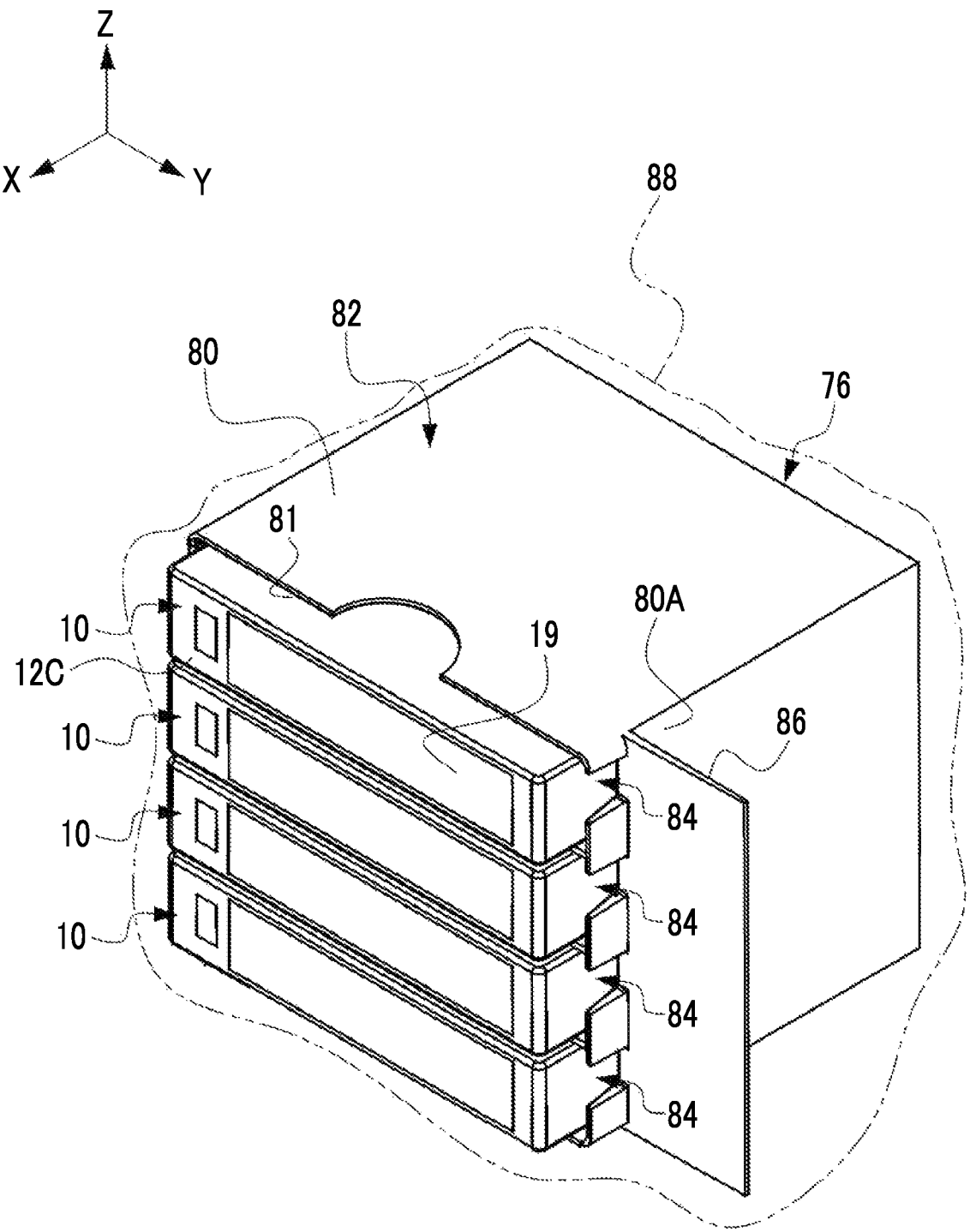
FIG. 12 is a schematic perspective view showing an example of an appearance in which a cartridge set according to the second embodiment is covered with a coating material.

In the above-described first embodiment, although a packaging example in a case where the nine magnetic tape cartridges 10 are held by the holder 20 has been described, in a present second embodiment, as shown in FIG. 12 as an example, a packaging example in a case where four magnetic tape cartridges 10 are held by a holder 76 will be described. In the present second embodiment, the components common to the above-described first embodiment are represented by the same reference numerals and description thereof will not be repeated, and portions different from the above-described first embodiment will be described.

In the present second embodiment, as shown in FIG. 12 as an example, the holder 76 is different from the holder 20 described in the above-described first embodiment in that a housing structure 80 is provided, instead of the housing structure 22. While the housing structure 22 has a structure in which the nine magnetic tape cartridges 10 are accommodated in such a manner that the magnetic tape cartridges 10 are able to be put in and out, the housing structure 80 has a structure in which four magnetic tape cartridges are accommodated in such a manner that the magnetic tape cartridges are able to be put in and out. An orientation of the holder 76 is defined by the X axis, the Y axis, and the Z axis in the same manner as in the above-described first embodiment.

An opening portion 81 is formed in the housing structure 80. The opening portion 81 is formed in the housing structure 80 in the same manner as the opening portion 23 described in the above-described first embodiment. The holder 76 holds the four magnetic tape cartridges 10 in such a manner that the magnetic tape cartridges 10 are able to be put in and out through the opening portion 81. An orientation of the magnetic tape cartridge 10 held by the holder 76 is the same as the orientation of the magnetic tape cartridge 10 held by the holder 20.

The holder 76 has four storage portions 84. A configuration of each of the storage portions 84 is the same as the configuration of the storage portion 24 described in the above-described first embodiment. The four storage portions 84 are formed in such a manner that the inside of the holder 76 is partitioned into a plurality of portions along one direction (in the example shown in FIG. 12, the Z direction). In the example shown in FIG. 12, the holder 76 having a rectangular parallelepiped shape is partitioned in four stages along a longitudinal direction (that is, the Z direction), whereby the four storage portions 84 are formed.

In the present second embodiment, a cartridge set 82 is used. The cartridge set 82 is an example of a "single individual" according to the technique of the present disclosure. The cartridge set 82 is formed with the holder 76 and the four magnetic tape cartridges 10 held by the holder 76. That is, the cartridge set 82 is a single individual formed by storing the four magnetic tape cartridges 10 in the holder 76. The four magnetic tape cartridges 10 are stored in the holder 76 in the same manner as the holder 20 described in the above-described first embodiment. The cartridge set 82 is loaded into the magnetic tape library 26 and used in the same manner as the cartridge set 62 described in the above-described first embodiment.

The holder 76 has a protruding piece 86. The protruding piece 86 is a flat plate-shaped piece that protrudes to the outside of the holder 76. In the example shown in FIG. 12, the protruding piece 86 protrudes from a right wall 80A of the housing structure 80 in a right direction of the holder 76 (that is, the side of the +Y direction). Here, although the flat plate-shaped piece is illustrated as an example of the protruding piece 86, the technique of the present disclosure is not limited thereto, and the protruding piece 86 may be a bent piece or may be a curved piece.

The whole of the cartridge set 82 is covered with a coating material 88. The coating material 88 is formed of the same material as the coating material 61 described in the above-described first embodiment. The whole of the cartridge set 82 is covered with the coating material 88 at pressure at which the protruding piece 86 does not protrude from the coating material 88. The coating material 88 is formed in a bag shape, and includes the whole of the cartridge set 82.

Figure 13:
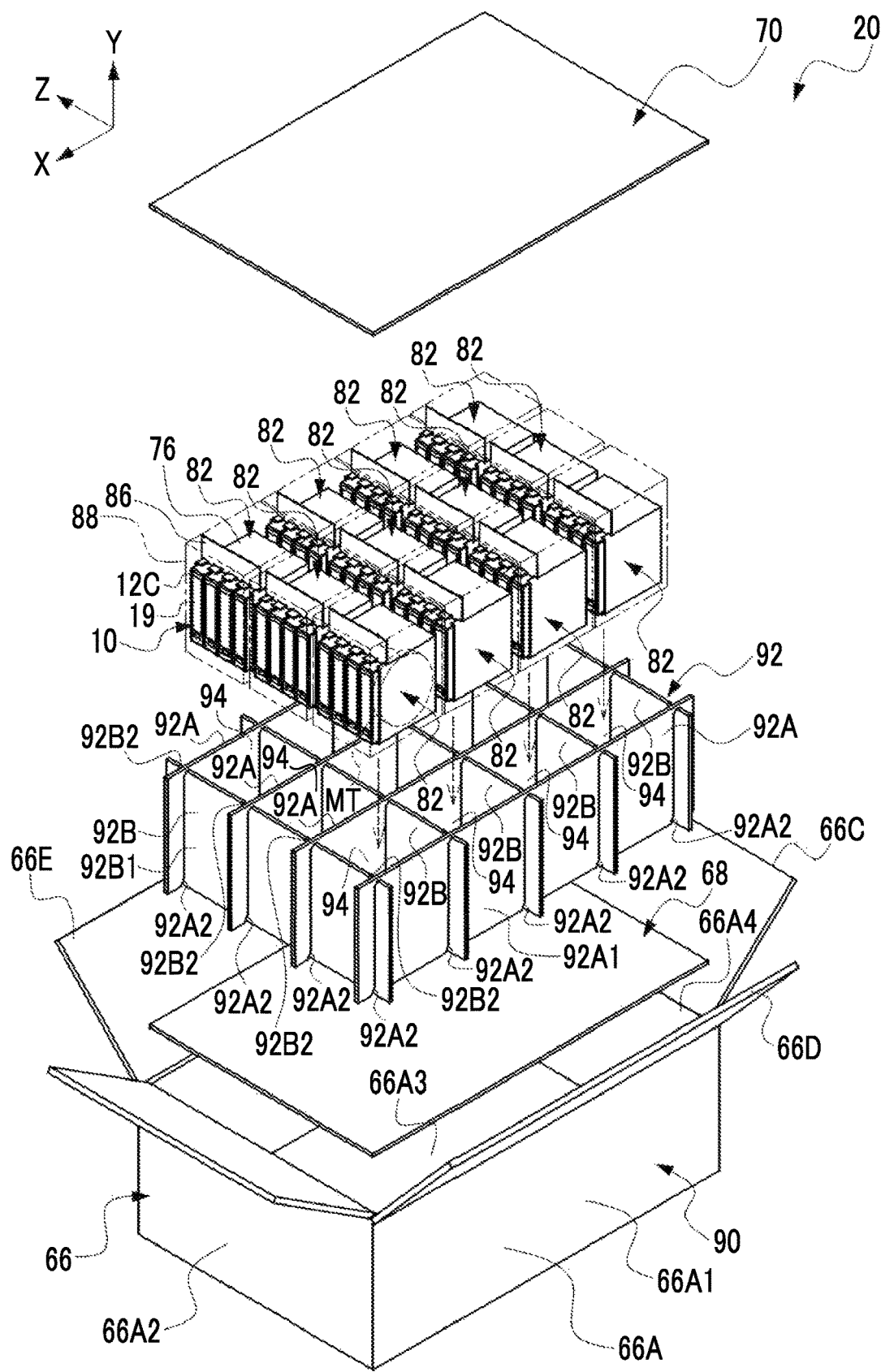
FIG. 13 is an exploded perspective view showing an example of an appearance of a package according to the second embodiment.

As shown in FIG. 13 as an example, a plurality of cartridge sets 82 are packaged by a corrugated cardboard 90 in a state of being individually covered with the coating material 88.

FIG. 13 shows an example of a configuration of a package 200. The package 200 comprises a plurality of cartridge sets 82 and the corrugated cardboard 90. The package 200 is an example of a "package" according to the technique of the present disclosure.

The corrugated cardboard 90 comprises a corrugated cardboard box 66, a first corrugated cardboard plate 68, a second corrugated cardboard plate 70, and a partition structure 92.

The partition structure 92 has a plurality of first partition members 92A and a plurality of second partition members 92B. The first partition members 92A and the second partition members 92B are formed in a long plate shape. Each of the first partition members 92A has a wide surface 92A1, and each of the second partition members 92B has a wide surface 92B1.

The number of first partition members 92A is the number of cartridge sets 82 accommodated in parallel along the transverse direction (in the example shown in FIG. 13, the Z direction) of the corrugated cardboard box body 66A among all cartridge sets 82 accommodated in the corrugated cardboard box 66 plus one. In the example shown in FIG. 13, the number of first partition members 92A is four.

A plurality of slits 92A2 are formed in each of the first partition members 92A. The slits 92A2 are opened on the downside in the vertical direction (in the example shown in FIG. 13, the side of the −Y direction). A plurality of slits 92A2 are formed at regular intervals along the longitudinal direction (in the example shown in FIG. 13, the X direction) of the first partition member 92A. The number of slits 92A2 is the number of cartridge sets 82 accommodated in parallel along the longitudinal direction (in the example shown in FIG. 13, the X direction) of the corrugated cardboard box body 66A among all cartridge sets 82 accommodated in the corrugated cardboard box 66 plus one. In the example shown in FIG. 13, five slits 92A2 are formed at regular intervals along the longitudinal direction of the first partition member 92A.

The number of second partition members 92B is the number of cartridge sets 82 accommodated in parallel along the longitudinal direction of the corrugated cardboard box body 66A among all cartridge sets 82 accommodated in the corrugated cardboard box 66 plus one. In the example shown in FIG. 13, the number of second partition members 92B is five.

A plurality of slits 92B2 are formed in each of the second partition members 92B. The slits 92B2 are opened on the upside in the vertical direction (in the example shown in FIG. 13, the side of the +Y direction). A plurality of slits 92B2 are formed at regular intervals along the longitudinal direction (in the example shown in FIG. 13, the Z direction) of the second partition member 92B. The number of slits 92B2 is the number of cartridge sets 82 accommodated in parallel along the transverse direction (in the example shown in FIG. 13, the Z direction) of the corrugated cardboard box body 66A among all cartridge sets 82 accommodated in the corrugated cardboard box 66 plus one. In the example shown in FIG. 13, four slits 92B2 are formed at regular intervals along the longitudinal direction of the second partition member 92B.

A plurality of first partition members 92A are disposed in an orientation in which the surfaces 92A1 overlap each other in the Z direction shown in FIG. 13, and a plurality of second partition members 92B are disposed in an orientation in which the surfaces 92B1 overlap each other in the X direction shown in FIG. 13. In this state, each slit 92A2 is inserted into the slit 92B2 in a corresponding positional relationship, whereby a plurality of second partition members 92B are fitted to a plurality of first partition members 92A. That is, a plurality of second partition members 92B are fitted to a plurality of first partition members 92A in the same manner in which a plurality of third partition members 72C are fitted to the first partition member 72A and the second partition member 72B described in the above-described first embodiment, and with this, the partition structure 92 is formed with a plurality of first partition members 92A and a plurality of second partition members 92B.

In the partition structure 92 formed in this way, one end portion in the longitudinal direction (in the example shown in FIG. 13, the Z direction) of a plurality of second partition members 92B fitted to a plurality of first partition members 92A projects from each slit 92A2 of the first partition member 92A positioned at one end among a plurality of first partition members 92A arranged in a first direction (in the example shown in FIG. 13, the Z direction). The other end portion in the longitudinal direction of a plurality of second partition members 92B fitted to a plurality of first partition members 92A projects from each slit 92A2 of the first partition member 92A positioned at the other end among a plurality of first partition members 92A arranged in the first direction. Furthermore, one end portion in the longitudinal direction (in the example shown in FIG. 13, the X direction) of a plurality of first partition members 92A fitted to a plurality of second partition members 92B projects from each slit 92B2 of the second partition member 92B positioned at one end among a plurality of second partition members 92B arranged along a second direction (in the example shown in FIG. 13, the X direction). The other end portion in the longitudinal direction of a plurality of first partition members 92A fitted to a plurality of second partition members 92B projects from each slit 92B2 of the second partition member 92B positioned at the other end among a plurality of second partition members 92B arranged along the second direction. In the partition structure 92, such projecting portions are hereinafter referred to as "second projecting portions".

The partition structure 92 is press-fitted into the corrugated cardboard box body 66A while bringing the second projecting portions into contact with the inner surface of the corrugated cardboard box body 66A in a state in which the surface 92A1 of each first partition member 92A is set parallel to the length surface 66A1 and in a state in which the surface 92B1 of each second partition member 92B is set parallel to the width surface 66A2. The second projecting portions of the partition structure 92 press-fitted into the corrugated cardboard box body 66A function as a buffer member that absorbs an impact from the side of the corrugated cardboard box body 66A.

In this way, in a case where the partition structure 92 is press-fitted into the corrugated cardboard box body 66A, in the corrugated cardboard box body 66A, a plurality of first partition members 92A are disposed in a state in which the surfaces 92A1 are parallel to each other. In the corrugated cardboard box body 66A, a plurality of second partition members 92B are disposed in a state in which the surfaces 92B1 are parallel to each other and in a state in which each surface 92B1 crosses a plurality of surfaces 92A1 (here, a state in which each surface 92B1 is perpendicular to a plurality of surfaces 92A1, as an example). As a result, a plurality of accommodation regions 94 are formed with the partition structure 92. A plurality of accommodation regions 94 are divided in a lattice by the partition structure 92. In the present second embodiment, the number of accommodation regions 94 is 12 (=3×4). Note that this is merely an example, and in a case where N and M are a natural number equal to or greater than two, the number of accommodation regions 94 may be N×M.

Each of a plurality of accommodation regions 94 is a region (for example, a rectangular parallelepiped space) divided by the partition structure 92. A plurality of cartridge sets 82 (that is, a plurality of holders 76 in a state of each holding a plurality of magnetic tape cartridges 10) are accommodated in a plurality of accommodation regions 94 in such a manner that a plurality of cartridge sets 82 are able to be put in and out. The partition structure 92 is an example of a "partition structure" according to the technique of the present disclosure, and a plurality of accommodation regions 94 are an example of "a plurality of accommodation regions" according to the technique of the present disclosure.

The cartridge set 82 covered with the coating material 88 is accommodated in the accommodation region 94 in a state in which the left side (that is, the side of the −Y direction) of the holder 76 turns toward the first corrugated cardboard plate 68 in corrugated cardboard box body 66A. In other words, the holder 76 in which a plurality of magnetic tape cartridges 10 are stored is accommodated in the accommodation region 94 in a posture in which the magnetic tape cartridges 10 are set in a portrait orientation. Here, the portrait orientation is an orientation in which both ends of the magnetic tape MT in the width direction (that is, the Z direction) are positioned along a direction crossing (here, as an example, a direction perpendicular to) a direction in which the holder 76 is put in and out of the accommodation region 94.

Figure 14:
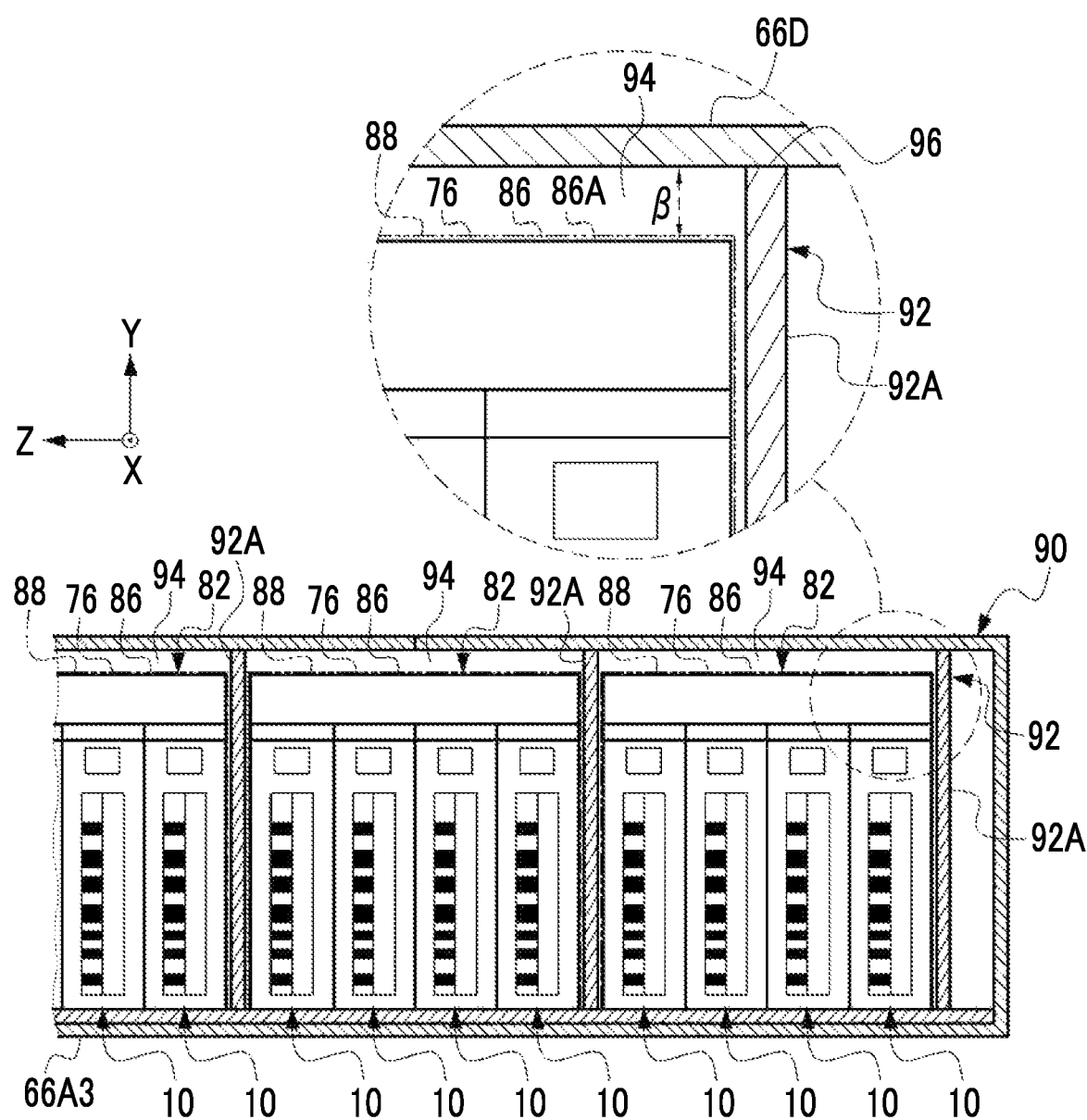
FIG. 14 is a schematic cross-sectional view showing an example of an aspect in cross section of the package according to the second embodiment.

FIG. 14 shows an example of an aspect in cross section where a plurality of cartridge sets 82 are accommodated in the corrugated cardboard box 66 in the same manner as in the above-described first embodiment. In the example shown in FIG. 14, to facilitate understanding of the technique of the present disclosure, the second corrugated cardboard plate 70 is not shown.

As shown in FIG. 14 as an example, in the corrugated cardboard box 66, in a state in which the cartridge set 82 is accommodated in the accommodation region 94 in the above-described manner, a height of the partition structure 92 (that is, a length of the partition structure 92 in the vertical direction) is higher than a height of the holder 76 (that is, a length of the holder 76 in the Y direction). Specifically, for example, in a state in which the cartridge set 82 is accommodated in the accommodation region 94 in the above-described manner, heights of all first partition members 92A and heights of all second partition members 92B are higher than the height of the holder 76. With this, in a state in which the cartridge set 82 is accommodated in the accommodation region 94 in the above-described manner, a spacing having a length β (>0) occurs between a distal end surface 86A of the protruding piece 86 of the holder 76 and an end surface 96 of the partition structure 92 on the upside in the vertical direction (in the example shown in FIG. 14, the side of the +Y direction).

The partition structure 92 has strength at the same level as the partition structure 72 described in the above-described first embodiment or strength higher than the partition structure 72. That is, in the same manner in which the partition structure 72 described in the above-described first embodiment has a given level of load bearing capable of maintaining the difference a, the partition structure 92 also has a given level of load bearing capable of maintaining the length β.

As described above, in the package 200, the cartridge set 82 covered with the coating material 88 is accommodated in each accommodation region 94 divided by the partition structure 92 in the corrugated cardboard box 66. Then, the height of the partition structure 92 is higher than the height of the holder 76. That is, the partition structure 92 operates in the package 200 in the same manner as in the above-described first embodiment. Therefore, also in the package 200, the same effects as the package 100 described in the above-described first embodiment are obtained.

In the package 200, since the cartridge set 82 is accommodated in each accommodation region 94 divided in a lattice by the partition structure 92, even though the packages 200 are stacked over a plurality of stages, the partition structure 92 in the package 200 positioned in a lower stage receives a load from the upside in the vertical direction (the side of the +Y direction shown in FIGS. 13 and 14). For this reason, the load from the upside in the vertical direction is not transmitted to the cartridge set 82 accommodated in each accommodation region 94 in the package 200 positioned in a lower stage. Accordingly, it is possible to suppress damage to a plurality of magnetic tape cartridges 10 in a plurality of cartridge sets 82 accommodated in a plurality of accommodation regions 94 divided in a lattice due to the load from the upside in the vertical direction. Also in regard to the protruding piece 86 formed in each holder 76 in a plurality of cartridge sets 82, it is possible to suppress damage due to the load from the upside in the vertical direction.

In the package 200, the whole of the cartridge set 82 is covered with the coating material 88 at pressure at which the protruding piece 86 does not protrude from the coating material 88. Accordingly, it is possible to suppress a situation in which the coating material 88 is torn by the protruding piece 86 and the protruding piece 86 protrudes from the coating material 88.

Other Modification Examples

In each of the above-described embodiments, although a form example where the barcode 19A is displayed as the identifier 19 has been described, the technique of the present disclosure is not limited thereto, and a two-dimensional matrix image, instead of the barcode 19A, may be displayed as the identifier 19.

In each of the above-described embodiments, although a form example where the holders 20 and 76 are cartridge magazines has been described, the technique of the present disclosure is not limited thereto. For example, the holders 20 and/or 76 may be a dedicated housing for transporting a plurality of magnetic tape cartridges 10.

In the above-described first embodiment, although a case where the height of the entire partition structure 72 in a case where the cartridge set 62 is accommodated in the accommodation region 74 is higher than the height of the holder 20 has been described, the technique of the present disclosure is not limited thereto. For example, the height of a part of the partition structure 72 may be made higher than the height of the holder 20. In a case of making the height of a part of the partition structure 72 higher than the height of the holder 20, for example, the height of the first partition member 72A and the height of the second partition member 72B may be made higher than the height of the holder 20 or the heights of a plurality of third partition members 72C may be made higher than the height of the holder 20. Also in this case, as in the above-described first embodiment, the partition structure 72 has load bearing capable of maintaining the difference a (see FIG. 9).

In the above-described second embodiment, although a case where the height of the entire partition structure 92 in a case where the cartridge set 82 is accommodated in the accommodation region 94 is higher than the height of the holder 76 has been described, the technique of the present disclosure is not limited thereto. For example, the height of a part of the partition structure 92 may be made higher than the height of the holder 76. In a case of making the height of a part of the partition structure 92 higher than the height of the holder 76, for example, the heights of a plurality of first partition members 92A (for example, all first partition members 92A) may be made higher than the height of the holder 76 or the heights of a plurality of second partition members 92B (for example, all second partition members 92B) may be made higher than the height of the holder 76. Also in this case, as in the above-described second embodiment, the partition structure 92 has load bearing capable of maintaining the length β (see FIG. 14).

In the above-described first embodiment, a form example where the nine magnetic tape cartridges 10 are stored in the holder 20 has been described, and in the above-described second embodiment, a form example where the four magnetic tape cartridges 10 are stored in the holder 76 has been described, but this is merely an example, and the number of magnetic tape cartridges 10 stored in the holders 20 and 76 may be any number.

In each of the above-described embodiments, although the 0201 type corrugated cardboard box is illustrated as the corrugated cardboard box 66, the technique of the present disclosure is not limited thereto. The corrugated cardboard box 66 may be a corrugated cardboard box other than the 0201 type corrugated cardboard box. Examples of the corrugated cardboard box other than the 0201 type corrugated cardboard box include a 0203 type or 0210 type corrugated cardboard box (that is, a 02 type corrugated cardboard box), a 03 type corrugated cardboard box, a 04 type corrugated cardboard box, a 05 type corrugated cardboard box, a 06 type corrugated cardboard box, or a 07 type corrugated cardboard box.

The content of the above description and the content of the drawings are detailed description of portions according to the technique of the present disclosure, and are merely examples of the technique of the present disclosure. For example, the above description relating to configuration, function, operation, and advantageous effects is description relating to configuration, function, operation, and advantageous effects of the portions according to the technique of the present disclosure. Thus, it is needless to say that unnecessary portions may be deleted, new elements may be added, or replacement may be made to the content of the above description and the content of the drawings without departing from the gist of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and the content of the drawings.

In the specification, "A and/or B" is synonymous with "at least one of A or B". That is, "A and/or B" may refer to A alone, B alone, or a combination of A and B. Furthermore, in the specification, a similar concept to "A and/or B" also applies to a case in which three or more matters are expressed by linking the matters with "and/or".

All cited documents, patent applications, and technical standards described in the specification are incorporated by reference in the specification to the same extent as in a case where each individual cited document, patent application, or technical standard is specifically and individually indicated to be incorporated by reference.

What is claimed is:

1. A package having a longitudinal direction defining an X direction, comprising:
   a plurality of accommodation regions where a plurality of holders are accommodated in such a manner that the plurality of holders are able to be put in and out in a Y direction, transverse to the X direction; and
   a partition structure configured to divide the plurality of accommodation regions,
   wherein each holder is configured to hold a plurality of magnetic tape cartridges in such a manner that the plurality of magnetic tape cartridges are able to be put in and out of the holder,
   each holder is configured to be accommodated in a respective one of the accommodation regions,
   in a state in which the holder is accommodated in the accommodation region, a length of the partition structure in the Y direction is longer than a length of the holder in the Y direction,
   the partition structure is separable from the package,
   a magnetic tape is accommodated in each of the magnetic tape cartridges, the holder is accommodated in the accommodation region in a posture in which the magnetic tape cartridges are set in a portrait orientation, the portrait orientation is an orientation in which both ends of the magnetic tape in a width direction are positioned along a direction crossing a direction in which the holder is put in and out of the accommodation region, a single individual is formed by each of the holders and the plurality of magnetic tape cartridges held by each of the holders, each of the holders has a housing structure configured to accommodate the plurality of magnetic tape cartridges inside, each of the holders has an opening portion which is an exposure region where the plurality of magnetic tape cartridges are exposed, the opening portion is formed by opening one surface in the housing structure with respect to an outside, the magnetic tape cartridge is put in and out of the holder through the opening portion, each of the plurality of accommodation regions has a partition wall surrounding all sides of the accommodated holder, and the partition wall of the accommodation region that directly faces an inner wall of the package has a projecting portion that presses against the inner wall in the X direction.

2. The package according to claim 1, wherein the partition structure divides the plurality of accommodation regions in one direction.

3. The package according to claim 1, wherein the partition structure divides the plurality of accommodation regions in a lattice.

4. The package according to claim 1, wherein a whole of the single individual is covered with a coating material.

5. The package according to claim 4, wherein the coating material is a film.

6. The package according to claim 5, wherein each holder has a protruding piece protruding to an outside, and the whole of the single individual is covered with the film at a pressure at which the protruding piece does not protrude from the film.

7. The package according to claim 1, wherein at least the exposure region of each holder is covered with a coating material.

8. The package according to claim 7, wherein the coating material is a film.

9. The package according to claim 1, wherein each holder is a magazine for the plurality of magnetic tape cartridges within each holder formed to be loadable into a magnetic tape library.

10. The package according to claim 1, wherein an identifier is displayed on a surface of each magnetic tape cartridge.

* * * * *